US006898932B2

(12) United States Patent
Kajita

(10) Patent No.: US 6,898,932 B2
(45) Date of Patent: May 31, 2005

(54) HYDRAULIC DRIVING UNIT

(75) Inventor: Yusuke Kajita, Ushiku (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 37 days.

(21) Appl. No.: 10/398,226

(22) PCT Filed: May 13, 2002

(86) PCT No.: PCT/JP02/04613

§ 371 (c)(1), (2), (4) Date: Apr. 3, 2003

(87) PCT Pub. No.: WO02/095239

PCT Pub. Date: Nov. 28, 2002

(65) Prior Publication Data

US 2004/0068983 A1 Apr. 15, 2004

(30) Foreign Application Priority Data

May 17, 2001 (JP) ....................................... 2001-148082

(51) Int. Cl.[7] ................................................ F16D 31/02
(52) U.S. Cl. .............................. 60/413; 60/424; 91/452
(58) Field of Search .......................... 60/413, 414, 424; 91/DIG. 2, 511, 512, 452, 444

(56) References Cited

U.S. PATENT DOCUMENTS 5,323,687 A 6/1994 Zenker et al.
5,797,310 A * 8/1998 Casey et al. .................. 60/424

FOREIGN PATENT DOCUMENTS

| | | |
|---|---|---|
| JP | 48-11803 | 2/1973 |
| JP | 50-8881 | 3/1975 |
| JP | 55-119838 | 9/1980 |

* cited by examiner

*Primary Examiner*—Edward K. Look
*Assistant Examiner*—Michael Leslie
(74) *Attorney, Agent, or Firm*—Crowell & Moring LLP

(57) ABSTRACT

A hydraulic driving unit is provided with a directional control valve 23 and directional control valve 24 for controlling a boom cylinder 6 and arm cylinder 7, both of which are driven by pressure oil delivered from a main hydraulic pump, respectively, a boom control device 25 for selectively controlling the directional control valve 23 and an arm control device 26 for selectively controlling the directional control valve 24, and is mounted on a hydraulic excavator. To permit effective use of pressure oil in a rod chamber 6*a* of the boom cylinder 6 when a bottom pressure of the arm cylinder 7 has become high while performing a combined operation such that pressure oil is being supplied to bottom chambers 6*a*,7*a* of the boom cylinder 6 and arm cylinder 7, the hydraulic driving unit is provided with a communication controlling means for bringing the rod chamber 6*b* of the boom cylinder 6 and the bottom chamber 7*a* of the arm cylinder 7 into communication with each other when the bottom pressure of the arm cylinder 7 has increased to a high pressure equal to or higher than a predetermined pressure.

17 Claims, 13 Drawing Sheets

HYDRAULIC DRIVING UNIT

TECHNICAL FIELD

This invention relates to a hydraulic driving unit mounted on a construction machine such as a hydraulic excavator to permit a combined operation of plural hydraulic cylinders.

BACKGROUND ART

As a hydraulic driving unit mounted on a construction machine to perform combined operations of plural hydraulic cylinders, there is known, for example, the hydraulic driving unit disclosed in JP 2000-337307A. This hydraulic driving unit is mounted on a hydraulic excavator. FIG. 11 is a hydraulic circuit diagram showing the construction of an essential part of the hydraulic driving unit disclosed in JP 2000-337307A, and FIG. 12 is a side view illustrating a hydraulic excavator on which the hydraulic driving unit shown in FIG. 11 is arranged.

The hydraulic excavator illustrated in FIG. 12 is provided with a travel base 1, a revolving superstructure 2 arranged on the travel base 1, a boom 3 mounted swingably in a vertical direction on the revolving superstructure 2, an arm 4 mounted swingably in a vertical direction on the boom 3, and a bucket 5 mounted turnably in a vertical direction on the arm 4. The boom 3, arm 4 and bucket 5 make up front attachments. The hydraulic excavator is also provided with a boom cylinder 6 which constitutes a first hydraulic cylinder for driving the boom 3, an arm cylinder 7 which constitutes a second hydraulic cylinder for driving the arm 4, and a bucket cylinder 8 for driving the bucket 5.

FIG. 11 shows a center-bypass hydraulic driving unit for driving the boom cylinder 6 and arm cylinder 7 in the above-mentioned hydraulic driving units suitable for arrangement on hydraulic excavators.

As shown in FIG. 11, the boom cylinder 6 is provided with a bottom chamber 6*a* and a rod chamber 6*b*. By supplying pressure oil to the bottom chamber 6*a*, the boom cylinder 6 is caused to extend to perform boom raising. By supplying pressure oil to the rod chamber 6*b*, on the other hand, the boom cylinder 6 is caused to retract to perform boom lowering. The arm cylinder 7 is also provided with a bottom chamber 7*a* and rod chamber 7*b*. By supplying pressure oil to the bottom chamber 8*a*, arm crowding is performed. By supplying pressure oil to the rod chamber 7*b*, on the other hand, arm dumping is performed.

The hydraulic driving unit which includes these arm cylinder 6 and arm cylinder 7 is provided with an engine 20, a main hydraulic pump 21 driven by the engine 20, a boom-related, directional control valve 23 as a first directional control valve for controlling a flow of pressure oil to be supplied from the main hydraulic pump 21 to the boom cylinder 6, an arm-related, directional control valve 24 as a second directional control valve for controlling a flow of pressure oil to be supplied from the main hydraulic pump 21 to the arm cylinder 7, a boom control device 25 as a first control device for selectively controlling the boom-related, directional control valve 23, an arm control device 26 as a second control device for selectively controlling the arm-related, directional control valve 24, and a pilot pump 22 driven by the engine 20.

The boom-related, directional control valve 23 is arranged on a line 28 extending to a delivery line of the main hydraulic pump 21, while the arm-related, directional control valve 24 is arranged on a line 27 extending to the above-mentioned delivery line.

The boom-related, directional control valve 23 and the bottom chamber 6*a* of the boom cylinder 6 are connected via a main line 29*a*, while the boom-related, directional control valve 23 and the rod chamber 6*b* of the boom cylinder 6 are connected via a main line 29*b*. Similarly, the arm-related, directional control valve 24 and the bottom chamber 7*a* of the arm cylinder 7 are connected via a main line 30*a*, while the arm-related, directional control valve 24 and the rod chamber 7*b* of the arm cylinder 7 are connected via a main line 30*b*.

The boom control device 25 is connected to the pilot pump 22. A pilot pressure produced as a result of its operation is supplied via one of pilot lines 25*a*,25*b* to a corresponding control compartment of the boom-related, directional control valve 23 such that the boom-related, directional control device 23 is changed over into the left position or the right position as viewed in FIG. 11.

Similarly, the arm control device 26 is also connected to the pilot pump 22. A pilot pressure produced as a result of its operation is supplied via one of pilot lines 26*a*,26*b* to a corresponding control compartment of the arm-related, directional control valve 24 such that the arm-related, directional control device 24 is changed over into the left position or the right position as viewed in FIG. 11.

In the hydraulic excavator provided with the hydraulic driving unit constructed as described above, the boom control device 25 shown in FIG. 11 is operated upon performing digging or the like of earth, and a pilot pressure is hence produced, for example, in the pilot line 25*a*. When the boom-related, directional control valve 23 is changed over into the left position as viewed in FIG. 11, the pressure oil delivered from the main hydraulic pump 21 is supplied to the bottom chamber 6*a* of the boom cylinder 6 via the line 28, the boom-related, directional control valve 23 and the main line 29*a*, while the pressure oil in the rod chamber 6*b* is caused to return to a reservoir 43 via the main line 29*b* and the boom-related, directional control valve 23. As a result, the boom cylinder 6 extends as indicated by arrow 13 in FIG. 12 so that the boom 3 is swung as indicated by arrow 12 in FIG. 12 to perform boom raising.

Concurrently with this boom raising operation, the arm control device 26 is also operated and a pilot pressure is hence produced, for example, in the pilot line 26*a*. when the arm-related, directional control valve 24 is changed over into the left position as viewed in FIG. 11, the pressure oil delivered from the main hydraulic pump 21 is supplied to the bottom chamber 7*a* of the arm cylinder 7 via the line 27, the arm-related, directional control valve 24 and the main line 30*a*, while the pressure oil in the rod chamber 7*b* is caused to return to the reservoir 43 via the main line 30*b* and the arm-related, directional control valve 24. As a result, the arm cylinder 7 extends as indicated by arrow 9 in FIG. 12 so that the arm 4 is swung as indicated by arrow 11 in FIG. 12 to perform arm crowding.

When an unillustrated bucket control device is also operated concurrently with such a boom raising and arm crowding operation to change over a bucket-related, directional control valve such that the bucket cylinder 8 illustrated in FIG. 12 is caused to extend in the direction of arrow 10 in FIG. 12, the bucket 5 is caused to turn in the direction of arrow 11 to perform earth digging work or the like as desired.

FIG. 13 contains characteristic diagrams illustrating pilot pressure characteristics and cylinder pressure characteristics in the above-described combined operation. In the lower diagram of FIG. 13, time lengths of digging work are plotted along abscissas, and pilot pressures produced by the control device are plotted along ordinates. A broken line 31 in the lower diagram of FIG. 13 indicates pilot pressures produced by the arm control device 26 and to be supplied to the pilot line 26*a*, while a solid line 32 in the lower diagram of FIG. 13 designates pilot pressures produced by the boom control device 25 and to be supplied to the pilot line 25*a*, that is, pilot pressures upon boom raising. T1, T2 and T3 indicate time points at which boom raising operations were performed, respectively.

In the upper diagram of FIG. 13, on the other hand, time lengths of digging work are plotted along abscissas, and load pressures produced in the hydraulic cylinders 6,7, in other words, cylinder pressures are plotted along ordinates. A broken line 33 in the upper diagram of FIG. 13 indicates bottom pressures produced in the bottom chamber 7*a* of the arm cylinder 7, that is, arm cylinder bottom pressures, while a solid line 34 designates rod pressures produced in the rod chamber 6*b* of the boom cylinder 6, that is, boom cylinder rod pressures. When such a combined operation of boom raising and arm crowding is performed, force in the direction of arrow 12 in FIG. 12 is transmitted to the boom 3 by counterforce produced when the bucket 5 digs earth. As a consequence, the boom cylinder 6 tends to be pulled in the direction of arrow 13 in FIG. 12, and as indicated by the boom rod pressure 34 in the upper diagram of FIG. 13, a high pressure is produced in the rod chamber 6*b* of the boom cylinder 6.

In the above-described conventional art, earth digging work or the like can be performed without a problem by combined operations of boom raising and arm crowding. Nonetheless, it is desired to achieve more efficient work.

The present inventors' attention was attracted to the current situation that the pressure oil in the rod chamber 6*b* of the first hydraulic cylinder as the boom cylinder 6 had been drained directly to the reservoir 43 upon performing the above-described combined operation of boom raising and arm crowding, namely when pressure oil was supplied to both of the bottom chambers 6*a*,7*a* of the first hydraulic cylinder as the boom cylinder 6 and the second hydraulic cylinder as the arm cylinder 7 and as a consequence, an operation which would lead to development of a higher rod pressure in the first hydraulic cylinder as the boom cylinder 6 was performed.

The present invention has been completed in view of the above-described situation of the conventional art, and as an object, has the provision of a hydraulic driving unit which makes it possible to effectively use the pressure oil in the rod chamber of the first hydraulic cylinder when the bottom pressure of the second hydraulic cylinder becomes high during a combined operation performed by supplying pressure oil to the respective bottom chambers of the first hydraulic cylinder and second hydraulic cylinder although the pressure oil in the rod chamber of the first hydraulic cylinder has heretofore been drained into the reservoir.

DISCLOSURE OF THE INVENTION

To achieve the above-described object, the invention provides a hydraulic driving unit mounted on a construction machine and provided with a main hydraulic pump, a first hydraulic cylinder and second hydraulic cylinder driven by pressure oil delivered from the main hydraulic pump, a first directional control valve for controlling a flow of pressure oil to be supplied from the main hydraulic pump to the first hydraulic cylinder, a second directional control valve for controlling a flow of pressure oil to be supplied from the main hydraulic pump to the second hydraulic pump, a first control device for selectively controlling the first directional control valve, and a second control device for selectively controlling the second directional control valve, characterized in that the hydraulic driving unit is provided with a communication control means for bringing a rod chamber of the first hydraulic cylinder and a bottom chamber of the second hydraulic cylinder into communication with each other when a bottom pressure of the second hydraulic cylinder has increased to a high pressure equal to or higher than a predetermined pressure.

According to the invention as described above, upon performing a combined operation of the first hydraulic cylinder and the second hydraulic cylinder by operating the first control device and second control device to change over the first directional control valve and the second directional control valve, respectively, and supplying the pressure oil from the main hydraulic pump to the respective bottom chambers of the first hydraulic cylinder and second hydraulic cylinder via the first directional control valve and the second directional control valve, the communication control means is operated to supply the pressure oil from the rod chamber of the first hydraulic cylinder to the bottom chamber of the second hydraulic cylinder when the bottom pressure of the second hydraulic cylinder has become a high pressure equal to or higher than the predetermined pressure. Described specifically, the pressure oil delivered from the main hydraulic pump and to be supplied via the second directional control valve and the pressure oil supplied from the rod chamber of the first hydraulic cylinder are combined and supplied to the bottom chamber of the second hydraulic cylinder, and as a consequence, an acceleration of the second hydraulic cylinder in its extending direction can be performed. As can be understood from the foregoing, it is possible to effectively use the pressure oil in the rod chamber of the first hydraulic cylinder, which has heretofore been drained to the reservoir, for the selective acceleration of the second hydraulic cylinder.

In a preferred embodiment of the invention the communication control means comprises a communication line capable of bringing the rod chamber of the first hydraulic cylinder and the bottom chamber of the second hydraulic cylinder into communication with each other, a check valve arranged on the communication line to prevent a flow of pressure oil from the bottom chamber of the second hydraulic cylinder toward the rod chamber of the first hydraulic cylinder, and a switching valve for communicating the communication line to a reservoir when the bottom pressure of the second hydraulic cylinder is lower than the predetermined pressure and for maintaining the communication line in a communicating state when the bottom pressure of the second hydraulic pressure has become equal to or higher than the predetermined pressure.

Upon performing a combined operation of the first hydraulic cylinder and the second hydraulic cylinder by supplying the pressure oil from the main hydraulic pump to the respective bottom chambers of the first hydraulic cylinder and second hydraulic cylinder, the switching valve is changed over to maintain the communication line in a communicating state when the bottom pressure of the second hydraulic cylinder has increased to a high pressure equal to or higher than the predetermined, and as a result, the pressure oil in the rod chamber of the first hydraulic cylinder is supplied to the bottom chamber of the second hydraulic cylinder via the communication line and the check valve. Described specifically, the pressure oil to be supplied to the bottom chamber of the second hydraulic cylinder via the second directional control valve and the pressure oil supplied from the rod chamber of the first hydraulic cylinder are combined and supplied, and as a consequence, an acceleration of the second hydraulic cylinder in its extending direction can be performed.

When the bottom pressure of the second hydraulic cylinder is a low pressure not reaching the predetermined pressure upon performing the combined operation of the first hydraulic cylinder and the second hydraulic cylinder as mentioned above, the switching valve is maintained such that the communication line is in communication with the reservoir. As a consequence, the pressure oil in the rod chamber of the first hydraulic cylinder is returned to the reservoir. In this case, the bottom chamber of the second hydraulic cylinder is supplied with pressure oil only via the second directional control valve so that no acceleration is performed in the extending direction of the second hydraulic cylinder.

In a still more preferred embodiment of the invention, the hydraulic driving unit is provided with a detection means for detecting the bottom pressure of the second hydraulic cylinder and the switching valve is operated in accordance with the bottom pressure of the second hydraulic cylinder as detected by the detection means.

When the bottom pressure of the second hydraulic cylinder is detected by the detection means to have increased to a high pressure equal to or higher than the predetermined pressure, the switching valve is changed over to maintain the communication line in a communicating state. As a consequence, the pressure oil in the rod chamber of the first hydraulic cylinder is supplied to the bottom chamber of the second hydraulic cylinder via the communication line and check valve.

In another aspect of the invention, the hydraulic driving unit is provided with a line connected at an end thereof to an upstream side of the switching valve and communicated at an opposite end thereof to the reservoir and an on/off valve arranged on the line to open the line responsive to a predetermined operation of the first control device.

When the predetermined operation of the first control device is an operation to supply pressure oil to the rod chamber of the first hydraulic cylinder, the communication line is brought into communication with the reservoir via the on/off valve owing to an operation of the on/off valve even when the bottom pressure of the second hydraulic cylinder is a high pressure equal to or higher than the predetermined pressure and the switching valve is changed over to maintain the communication line in the communicating state. It is, therefore, possible to avoid such a situation that the pressure oil in the bottom chamber of the first hydraulic cylinder would be supplied to the bottom chamber of the second hydraulic cylinder via the communication line.

Further, the first control device is a pilot control device for generating a pilot pressure and the on/off valve is a pilot-controlled check valve.

The pilot-controlled check valve is operated responsive to an operation of the pilot control device, and the communication line is brought into communication with the reservoir via the pilot-controlled check valve.

In still another aspect of the invention the switching valve comprises a variable restrictor.

The opening of the variable restrictor included in the switching valve varies in accordance with the level of the bottom pressure of the second hydraulic cylinder. Described specifically, when the bottom pressure of the second hydraulic cylinder is a high pressure equal to or higher than the predetermined pressure but is not a substantially high pressure, the opening of the variable restrictor in the switching valve becomes smaller such that the flow rate of the pressure oil to be supplied from the rod chamber of the first hydraulic cylinder to the communication line through the variable restrictor can be reduced. When the bottom pressure of the second hydraulic cylinder has become a very high pressure, on the other hand, the opening of the variable restrictor in the switching valve becomes greater such that the flow rate of the pressure oil to be supplied from the rod chamber of the first hydraulic cylinder to the communication line through the variable restrictor can be increased.

In a modification, the hydraulic driving unit is provided with a first flow rate control means for controlling a flow rate through the communication line in accordance with a quantity of an operation of the second control device.

The flow rate through the communication line can be controlled in accordance with the quantity of an operation of the second control device, which controls the second hydraulic cylinder, without relying solely upon the quantity of a change-over of the switching valve. Namely, the speed of the second hydraulic cylinder, which is in an accelerated state, can be controlled in accordance with the quantity of an operation of the second control device.

The first flow rate control means comprises a variable restrictor.

When the quantity of an operation of the second control device is relatively small, the opening of the variable restrictor becomes relatively small and through this small opening, the pressure oil can be supplied at a relatively low flow rate from the communication line to the bottom chamber of the second hydraulic cylinder. As a consequence, the speed of the second hydraulic cylinder, which is in an accelerated state, can be rendered relatively low. When the quantity of an operation of the second control device becomes relatively great and the opening of the variable restrictor becomes large, the pressure oil can be supplied at a relatively high flow rate from the communication line to the bottom chamber of the second hydraulic cylinder through the large opening. As a consequence, the speed of the second hydraulic cylinder, which is in an accelerated state, can be rendered relatively high.

In another preferred embodiment of the invention, the hydraulic driving unit is provided with a second flow rate control means for controlling a flow rate through the communication line in accordance with a quantity of an operation of the first control device.

The flow rate through the communication line can also be controlled via the second flow rate control means in accordance with the quantity of an operation of the first control device which controls the first hydraulic cylinder. Namely, the speed of the second hydraulic cylinder, which is in an accelerated state, can be controlled in accordance with the quantity of an operation of the second control device.

it is preferred that the second flow rate control means comprises a variable restrictor.

When the quantity of an operation of the first control device is relatively small, the opening of the variable restrictor associated with the operation of the first control device becomes relatively small and as a result of the operation of the first control device, the pressure oil can be supplied at a relatively low flow rate from the communication line to the bottom chamber of the second hydraulic cylinder through this small opening. As a consequence, the speed of the second hydraulic cylinder, which is in an accelerated state, can be rendered relatively low. When the quantity of an operation of the first control device is relatively great, the opening of the variable restrictor associated with this operation of the first control device becomes relatively large, and as a result of the operation of the first control device, the pressure oil can be supplied at a relatively high flow rate from the communication line to the bottom chamber of the second hydraulic cylinder through the large opening. As a consequence, the speed of the second hydraulic cylinder, which is in an accelerated state, can be rendered relatively high.

The first control device preferably is a pilot control device for generating a pilot pressure, the switching valve is a pilot-controlled switching valve with a variable restrictor incorporated therein and the second flow rate control means comprises a control line for bringing the first control device and a control compartment of the pilot-controlled switching valve into communication with each other.

When the quantity of an operation of the first control device is relatively small, the pilot pressure applied from the first control device to the control compartment of the pilot-controlled switching valve via the control line is relative low, the opening of the variable restrictor included in the pilot-controlled switching valve hence becomes relatively small, and as a result of the operation of the first control device, the pressure oil can be supplied at a relatively low flow rate from the communication line to the bottom chamber of the second hydraulic cylinder through this small opening. As a consequence, the speed of the second hydraulic cylinder, which is in an accelerated state, can be rendered relatively low. When the quantity of an operation of the first control device is relatively great, the pilot pressure applied from the first control device to the control compartment of the pilot-controlled switching valve through the control line is relatively high, the opening of the variable restrictor included in the pilot-operated switching valve hence becomes relatively large, and as a result of the operation of the first control device, the pressure oil can be supplied at a relatively high flow rate from the communication line to the bottom chamber of the second hydraulic cylinder through the large opening. As a consequence, the speed of the second hydraulic cylinder, which is in an accelerated state, can be rendered relatively high.

The communication control means comprises a bottom pressure detector for detecting the bottom pressure of the second hydraulic cylinder and outputting an electrical signal and a controller for outputting a control signal to selectively control the switching valve in accordance with the signal outputted from the bottom pressure detector.

When the bottom pressure of the second hydraulic cylinder is detected by the bottom pressure detector to have become a high pressure equal to or higher than the predetermined pressure, an electrical signal outputted from the bottom pressure detector is inputted to the controller. As a consequence, a control signal to change over the switching valve is outputted from the controller so that the switching valve is changed over to maintain the communication line in the communicating state. As a result, the pressure oil in the rod chamber of the first hydraulic cylinder is supplied to the bottom chamber of the second hydraulic cylinder via the check valve.

The hydraulic driving unit is provided with a first operated-quantity detector for detecting a quantity of an operation of the second control device and outputting an electrical signal, and the controller comprises a first function generator for outputting a value such that the value gradually becomes greater as the bottom pressure of the second hydraulic cylinder becomes higher, a second function generator for outputting a value such that the value gradually becomes greater but not beyond 1 as an upper limit as the quantity of the operation of the second control device becomes greater, and a first multiplier for performing multiplication to output the control signal in accordance with a signal outputted from the first function generator and a signal outputted from the second function generator.

When a value which gradually becomes greater as the bottom pressure of the second hydraulic cylinder becomes higher is outputted from the first function generator and a value corresponding to the quantity of an operation of the second control device is outputted by the first operated-quantity detector, the first multiplier performs computing such that these values outputted from the first and second function generators are multiplied with each other. A control signal corresponding to the thus-computed value is outputted from the controller, and the quantity of a change-over of the switching valve is controlled. Namely, the speed of the second hydraulic cylinder, which is in an accelerated state, can be controlled in accordance with the quantity of an operation of the second control device.

In another embodiment of the invention the hydraulic driving unit is provided with a second operated-quantity detector for detecting a quantity of an operation of the first control device to output an electrical signal, and the controller comprises a third function generator for outputting a value such that the value gradually becomes greater but not beyond 1 as an upper limit as the quantity of the operation of the first control device becomes greater and a second multiplier for performing multiplication to output the control signal in accordance with a signal outputted from the first multiplier and a signal outputted from the third function generator.

When a value corresponding to the quantity of an operation of the first control device is outputted by the second operated-quantity detector from the third function generator, the second multiplier performs computing such that the value outputted from the first function generator and the value outputted from the third function generator are multiplied with each other. A control signal corresponding to the thus-computed value is outputted from the controller, and the quantity of a change-over of the switching valve is controlled. Namely, the speed of the second hydraulic cylinder, which is in an accelerated state, can be controlled in accordance with the quantity of an operation of the first control device.

The switching valve is a pilot-controlled switching valve, and the hydraulic driving unit is provided with an electrohydraulic converter for outputting a control pressure corresponding to a value of the control signal outputted from the controller and a control line through which the electrohydraulic converter and a control compartment of the pilot-controlled switching valve are communicated with each other.

When a control signal outputted from the controller is applied to the electrohydraulic converter, a pilot pressure of a magnitude corresponding to the value of the control signal is applied from the electrohydraulic converter to the control compartment of the pilot-controlled switching valve via the control line, and the quantity of a change-over of the switching valve is controlled in accordance with the level of the pilot pressure.

The first hydraulic cylinder and the second hydraulic cylinder comprise a boom cylinder and an arm cylinder, respectively, the first directional control valve and the second directional control valve comprise a center-bypass directional control valve for a boom and a center-bypass directional control valve for an arm, respectively, and the first control device and the second control device comprise a boom control device and an arm control device, respectively.

When the bottom pressure of the arm cylinder increases to a high pressure equal to or higher than the predetermined pressure upon performing a combined operation of the boom cylinder and the arm cylinder, specifically a combined operation of boom raising and arm crowding by operating the boom control device and the arm control device to change over the boom-related, directional control valve and the arm-related, directional control valve, respectively, and supplying the pressure oil from the main hydraulic pump to the respective bottom chambers of the boom cylinder and arm cylinder via the boom-related, directional control valve and arm-related, directional control valve, the communication control means operates so that the pressure oil in the rod chamber of the boom cylinder is supplied to the bottom chamber of the arm cylinder. Described specifically, the pressure oil delivered from the main hydraulic pump and supplied via the arm-related, directional control valve and the pressure oil supplied from the rod chamber of the boom cylinder are combined and supplied to the bottom chamber of the arm cylinder, and as a result, an acceleration of the arm cylinder in its extending direction, that is, an acceleration of arm crowding can be performed.

The invention finds practical application when the construction machine is a hydraulic excavator.

BEST MODES FOR CARRYING OUT THE INVENTION

The embodiments of the hydraulic driving unit according to the present invention will hereinafter be described based on the drawings.

Figure 1:
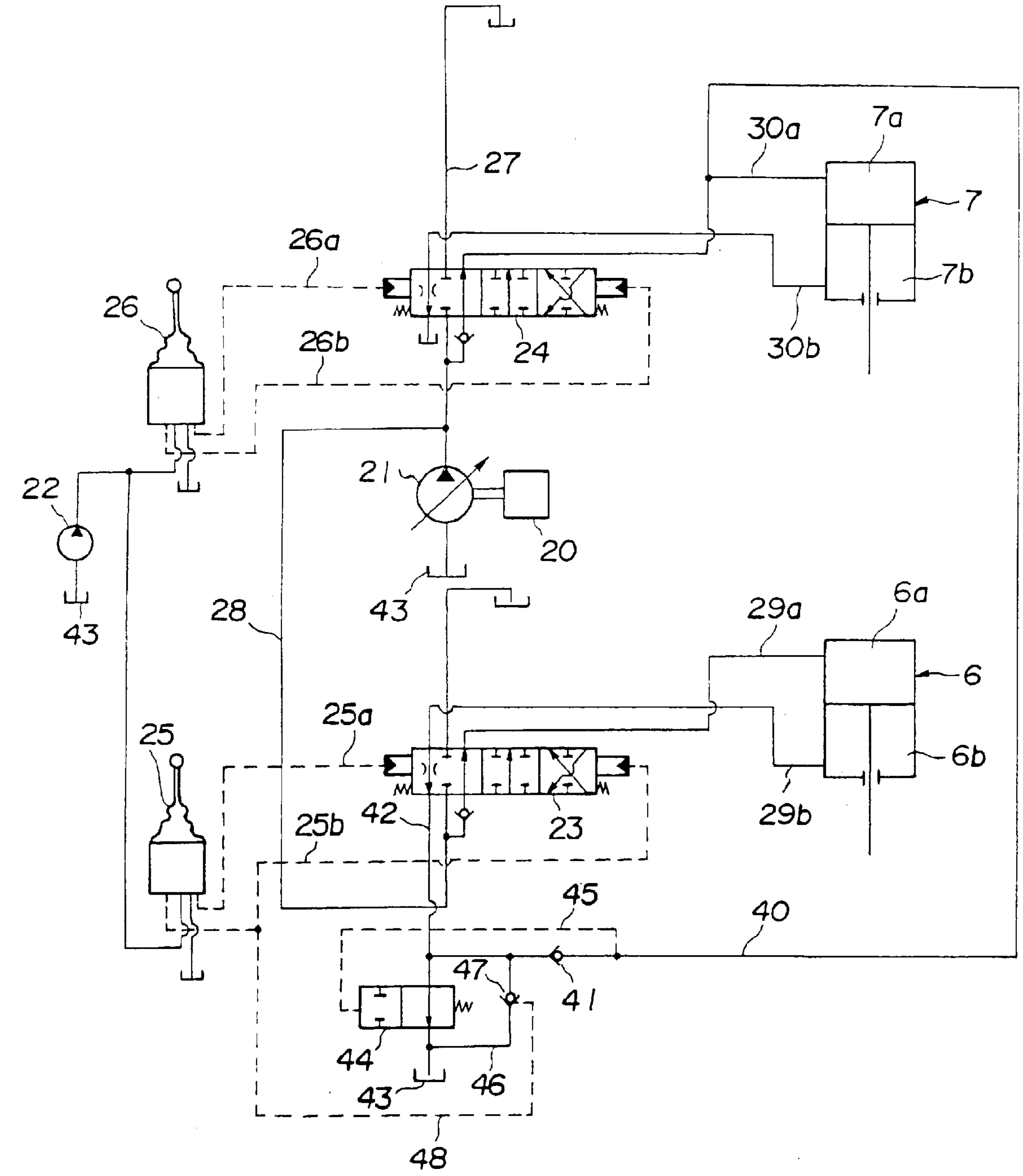
FIG. 1 is a hydraulic circuit diagram showing a first embodiment of the hydraulic driving unit according to the present invention.

FIG. 1 is a circuit diagram showing the first embodiment of the hydraulic driving unit according to the present invention.

In FIG. 1 and also in FIGS. 3 to 7 and 9 to be described subsequently herein, elements equivalent to those shown in FIG. 11 described above are indicated by like reference numerals. Further, the first embodiment shown in FIG. 1 and the second to seventh embodiments to be described subsequently herein are also arranged on construction machines, for example, on the above-described hydraulic excavator illustrated in FIG. 12. The reference numerals shown in FIG. 12 will, therefore, be referred to in the subsequent description as needed.

The first embodiment shown in FIG. 1 is designed to drive, for example, a boom cylinder 6 as a first hydraulic cylinder and an arm cylinder 7 as a second hydraulic cylinder by a similar center-bypass hydraulic driving unit as in the above-described conventional art. Although overlapping will occur with the description based on FIG. 11, the first embodiment shown in FIG. 1 is also constructed such that the boom cylinder 6 is provided with a bottom chamber 6*a* and a rod chamber 6*b* and the arm cylinder 7 is likewise provided with a bottom chamber 7*a* and a rod chamber 7*b*.

The first embodiment is also provided with an engine 20, a main hydraulic pump 21 and pilot pump 22 driven by the engine 20, a first directional control valve for controlling a flow of pressure oil to be supplied to the boom cylinder 6, i.e., a boom-related, directional control valve 23 of the center bypass type, a second directional control valve for controlling a flow of pressure oil to be supplied to the arm cylinder 7, i.e., an arm-related, directional control valve 24 of the center bypass type. Also provided are a first control device for selectively controlling the boom-related, directional control valve 23, i.e., a boom control device 25 and a second control device for selectively controlling the arm-related, directional control valve 24, i.e., an arm control device 26.

Lines 27,28 are connected to a delivery line of the main hydraulic pump 21, the arm-related, directional control valve 24 is arranged on the line 27, and the boom-related, directional control valve 23 is arranged on the line 28.

The boom-related, directional control valve 23 and the bottom chamber 6*a* of the boom cylinder 6 are connected via a main line 29*a*, while the boom-related, directional control valve 23 and the rod chamber 6*b* of the boom cylinder 6 are connected via a main line 29*b*. The arm-related, directional control valve 24 and the bottom chamber 7*a* of the arm cylinder 7 are connected via a main line 30*a*, while the arm-related, directional control valve 24 and the rod chamber 7*b* of the arm cylinder 7 are connected via a main line 30*b*.

The boom control device 25 and arm control device 26 are composed, for example, of pilot control devices which produce pilot pressures, and are connected to a pilot pump 22. Further, the boom control device 25 is connected to control compartments of the boom-related, directional control valve 23 via pilot lines 25*a*,25*b*, respectively, while the arm control device 26 is connected to control compartments of the arm-related, directional control valve 24 via pilot lines 26*a*,26*b*, respectively.

Figure 11:
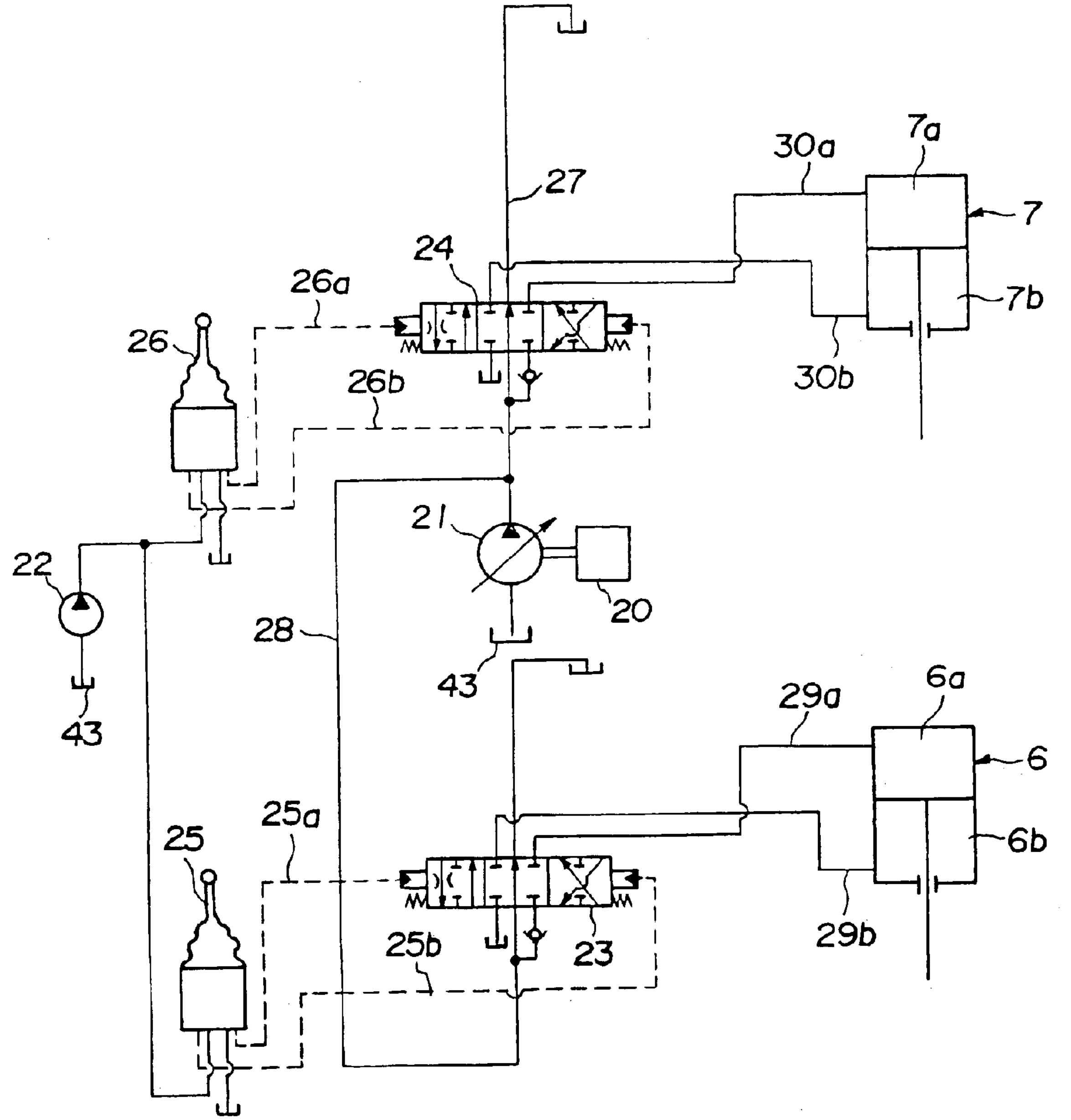
FIG. 11 PRIOR ART
FIG. 11 is a hydraulic circuit diagram showing a conventional hydraulic driving unit.

The above-described constitution is similar to the above-described constitution illustrated in FIG. 11.

This first embodiment is provided especially with a communication control means for bringing a rod chamber 6*b* of the boom cylinder 6, which makes up the first hydraulic cylinder, and a bottom chamber 7*a* of the arm cylinder 7, which makes up the second hydraulic cylinder, into communication with each other when a bottom pressure of the arm cylinder 7 has increased to a high pressure equal to or higher than a predetermined pressure. As illustrated by way of example in FIG. 1, this communication control means includes a communication line 40 capable of communicating the rod chamber 6*b* of the boom cylinder 6 and the bottom chamber 7*a* of the arm cylinder 7, a check valve 41 arranged on the communication line 40 to prevent a flow of pressure oil from the bottom chamber 7*a* of the arm cylinder 7 toward the rod chamber 6*b* of the boom cylinder 6, and a switching valve 44 for bringing the communication line 40 into communication with a reservoir when the bottom pressure of the arm cylinder 7 is lower than the predetermined pressure and for bringing the communication line 40 into a communicating state when the bottom pressure of the arm cylinder 7 has become a high pressure equal to or higher than the predetermined pressure. This switching valve 44 is composed of a pilot-controlled switching valve which is changed over by a control pressure. Described specifically, the communication line 40 located between the check valve 41 and the bottom chamber 7*a* of the arm cylinder 7 is provided with a detection means for detecting the bottom pressure of the arm cylinder 7, for example, a control line 45, and responsive to a control pressure corresponding to the bottom pressure of the arm cylinder 7 as detected by the control line 45, the switching valve 44 is operated, in other words, selectively controlled.

Also arranged are a line 46 connected at an end thereof to the communication line 40 located on an upstream side of the check valve 41 and at an opposite end thereof to a reservoir 43; and an on/off valve, for example, a pilot-controlled check valve 47 arranged on the line 46 such that responsive to a predetermined operation of the boom control device as the first control device, for example, an operation to supply pressure oil to the pilot line 25*b* to perform boom lowering, the line 46 is opened. The above-described pilot line 25*b* and pilot-controlled check valve 47 are connected together by a control line 48.

In the first embodiment constituted as described above, combined operations of the boom cylinder 6 and the arm cylinder 7 are performed as will be described hereinafter.

[Combined Operation of Boom Raising and Arm Crowding]

Figure 12:
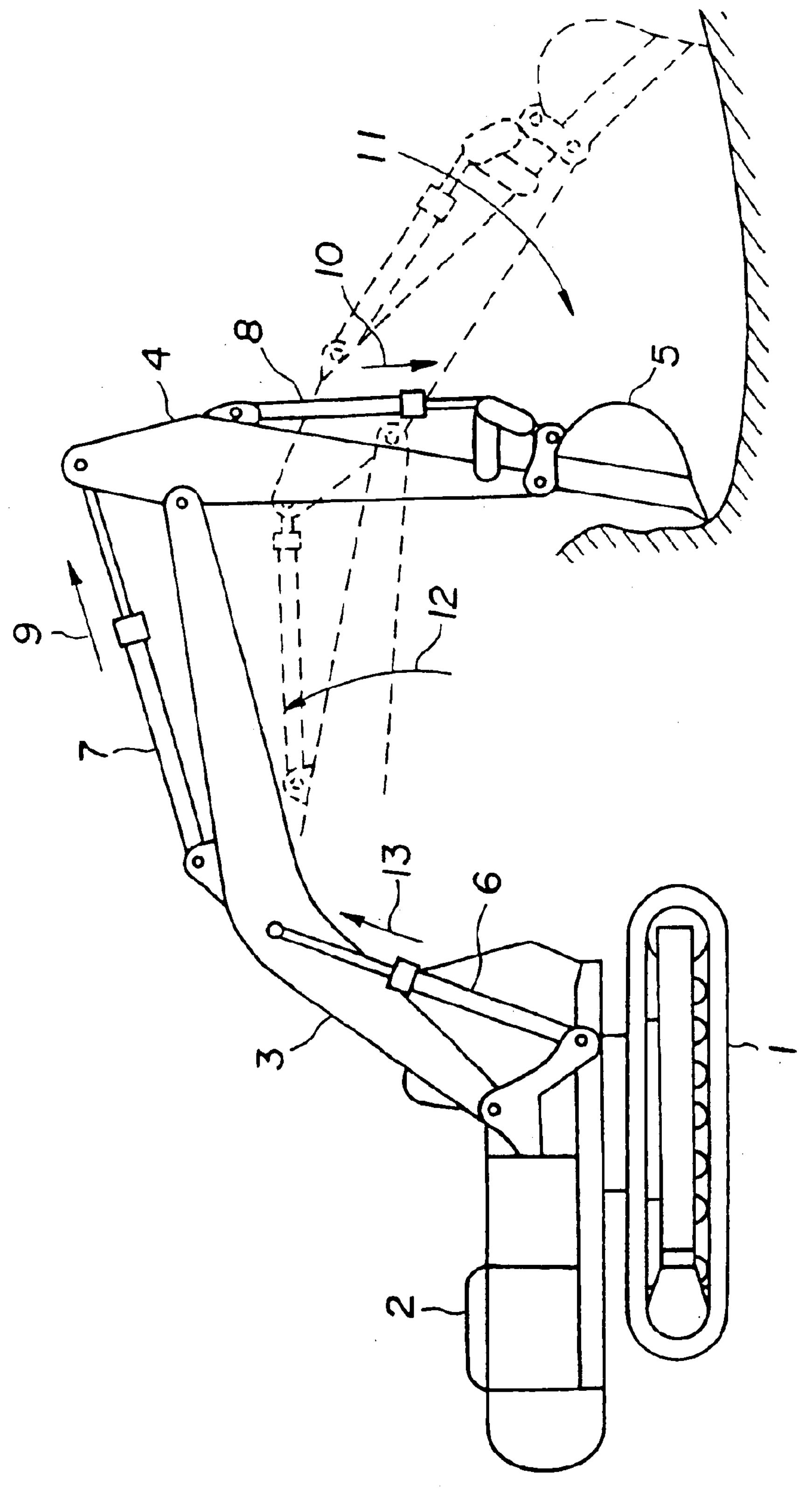
FIG. 12 PRIOR ART
FIG. 12 is a side view depicting a hydraulic excavator described as an example of a construction machine on which the hydraulic driving unit shown in FIG. 11 is arranged.

When the boom control device 25 is operated to supply a pilot pressure to the pilot line 25*a* such that the boom-related, directional control valve 23 is changed over into the left position shown in FIG. 1 and further, the arm control device 26 is operated to supply a pilot pressure to the pilot line 26*a* such that the arm-related, directional control valve 24 is changed over into the left position shown in FIG. 1, pressure oil delivered from the main hydraulic pump 21 is supplied to the bottom chamber 6*a* of the boom cylinder 6 via the line 28, the boom-related, directional control valve 23 and the main line 29*a*, and further, the pressure oil delivered from the main hydraulic pump 21 is also supplied to the bottom chamber 7*a* of the arm cylinder 7 via the line 27, the arm-related, directional control valve 24 and the main line 30*a*. As a result, the boom cylinder 6 and arm cylinder 7 are both operated in extending directions so that as shown in FIG. 12, the boom 3 and arm 4 are caused to swing in the directions of arrows 12 and 11, respectively, to perform a combined operation of boom raising and arm crowding.

During the above-described combined operation, the pilot line 25*b* of the boom operating system is not supplied with the pilot pressure, and remains under the same pressure as the reservoir pressure. Therefore, the control line 48 takes the reservoir pressure so that the pilot-controlled check valve 47 remains in a closed position to prevent communication between the communication line 40 and the reservoir 43 via the line 46.

In a state that the bottom pressure of the arm cylinder 7 is lower than the predetermined pressure, on the other hand, the force of a control pressure applied to the control compartment of the switching valve 44 via the communication line 40 and the control line 45 is smaller than the spring force, and therefore, the switching valve 44 is held in the right position shown in FIG. 1. In this state, the rod chamber 6*b* of the boom cylinder 6 is maintained in communication with the reservoir 43 via the main line 29*b*, the boom-related, directional control valve 23, a reservoir line 42, and the switching valve 44. During an extending operation of the boom cylinder 6, the pressure oil in the rod chamber 6*b* of the boom cylinder 6 is, therefore, returned to the reservoir 43, and the pressure oil in the rod chamber 6*b* is not supplied to the communication line 40.

When the bottom pressure of the arm cylinder 7 rises to a high pressure equal to or higher than the predetermined pressure from such a state as described above, the force of a control pressure applied to the control compartment of the switching valve 44 via the communication line 40 and the control line 45 becomes greater than the spring force so that the switching valve 44 is changed over into the left position in FIG. 1. When this state is established, the reservoir line 42 is cut off by the switching valve 44 so that the pressure oil, which has been guided from the rod chamber 6*b* of the boom cylinder 6 into the main line 29*b*, the boom-related, directional control valve 23 and the reservoir line 42, is supplied to the communication line 40 via the check valve 41. The pressure oil supplied to the communication line 40 is supplied to the bottom chamber 7*a* of the arm cylinder 7 via the main line 30*a*. Namely, the pressure oil delivered from the main hydraulic pump 21 via the arm-related, directional control valve 24 and the pressure oil supplied from the rod chamber 6*b* of the boom cylinder 6 are combined and supplied to the bottom chamber 7*a* of the arm cylinder 7. As a result, an acceleration of arm cylinder 6 in the extending direction can be achieved. In other words, the operating speed of arm crowding can be rendered faster.

Figure 2:
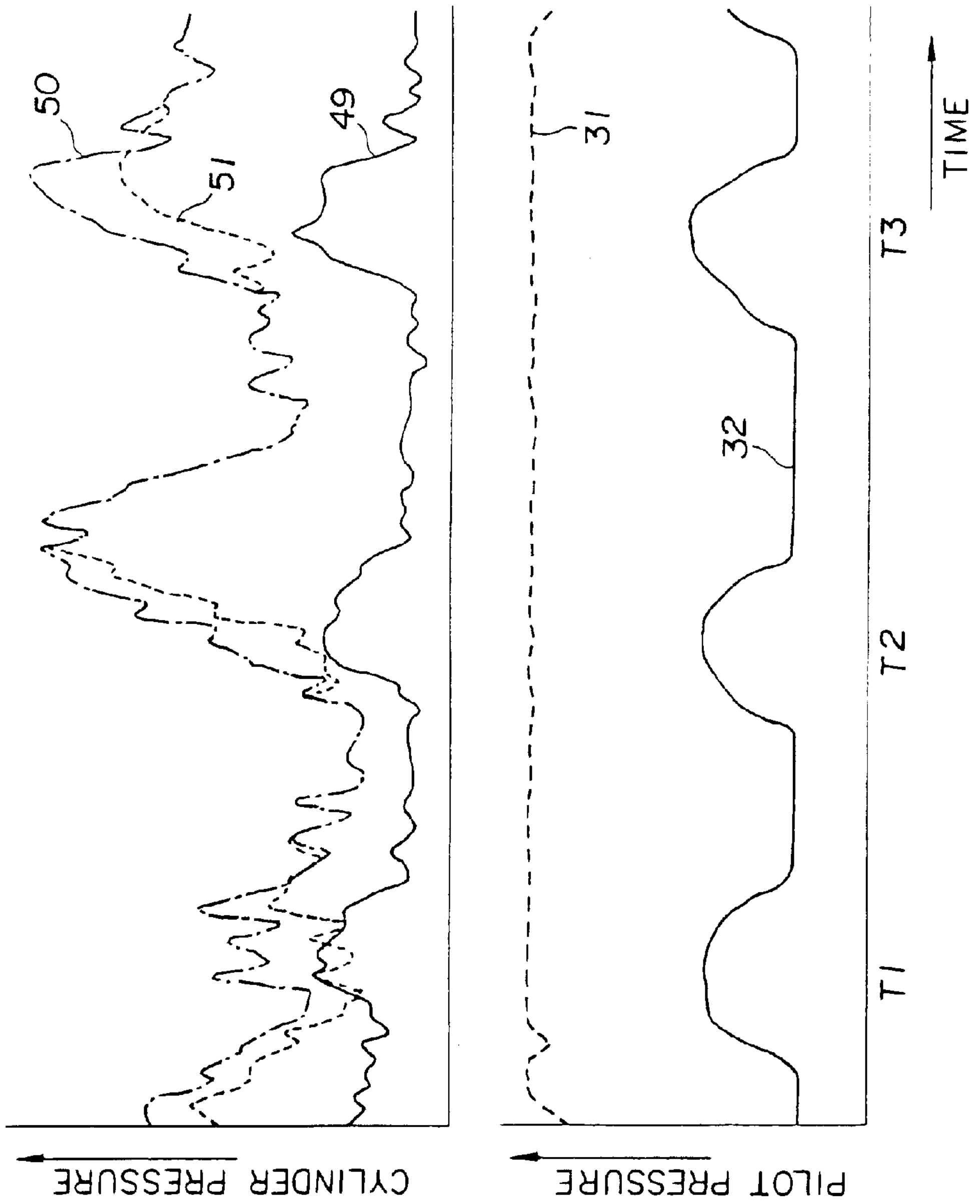
FIG. 2 contains characteristic diagrams illustrating pilot pressure characteristics and cylinder flow-rate characteristics in the first embodiment shown in FIG. 1.

FIG. 2 contains characteristic diagrams showing pilot pressure characteristics and cylinder flow-rate characteristics in the first embodiment illustrated in FIG. 1.

Figure 13:
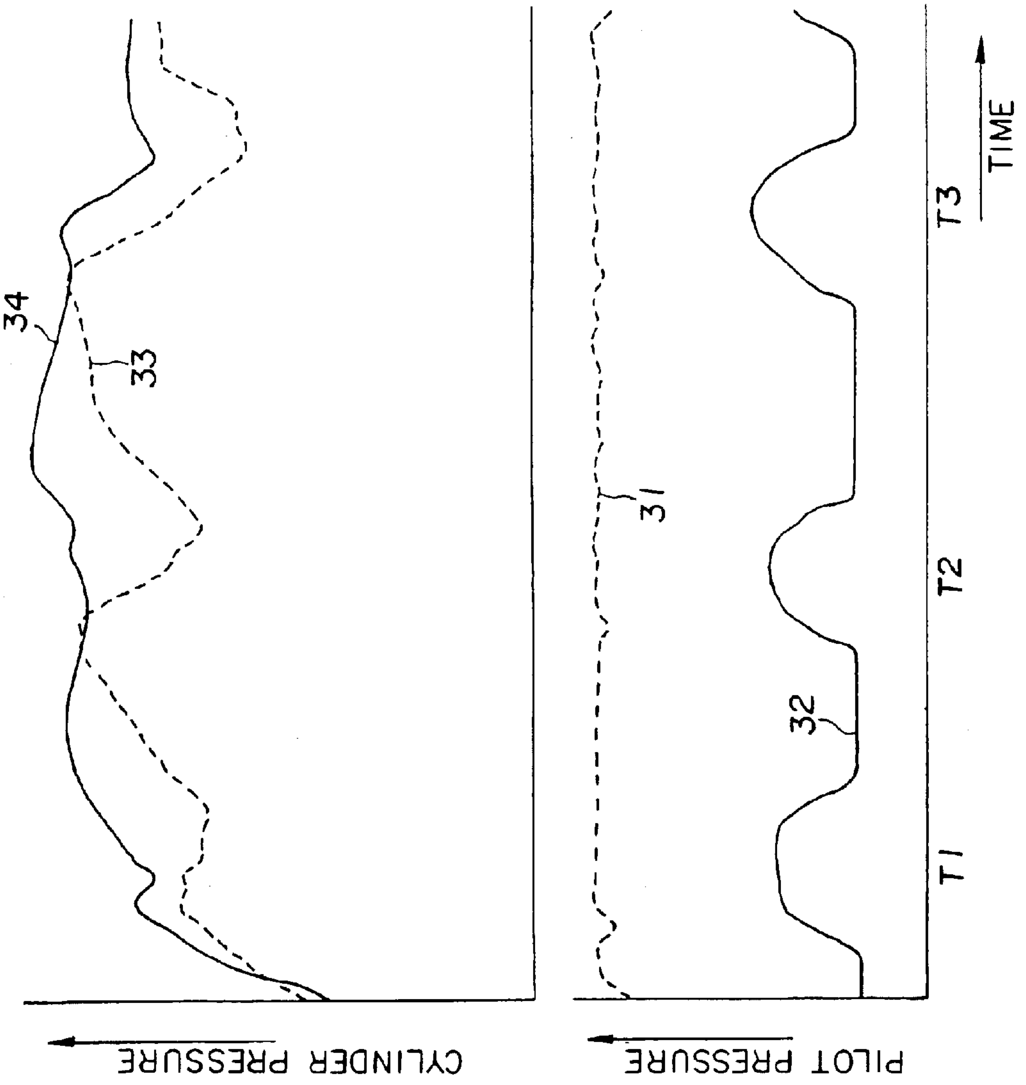
FIG. 13 PRIOR ART
FIG. 13 contains characteristic diagrams illustrating pilot pressure characteristics and cylinder pressure characteristics in the conventional hydraulic driving unit.

In FIG. 2, the lower diagram is similar to that shown in FIG. 13 described above. In the upper diagram, a solid line 49 indicates a delivery flow rate from the rod chamber 6*a* of the boom cylinder 6, an alternate long and short dash line 50 designates the rate of an inflow into the bottom chamber 7*a* of the arm cylinder 7 as obtained by the first embodiment, and a broken line 51 represents the rate of an inflow into the bottom chamber 7*a* of the arm cylinder 7 in the above-described conventional art illustrated in FIGS. 11 to 13. As evident from FIG. 2, compared with the conventional art, the first embodiment can increase the rate of an inflow into the bottom chamber 7*a* of the arm cylinder 7, and as mentioned above, can perform an acceleration in arm crowding.

[Boom Lowering and Arm Crowding Operation]

When the boom control device 25 is operated to supply a pilot pressure to the pilot line 25*b* such that the boom-related, directional control valve 23 is changed over into the right position shown in FIG. 1 and further, the arm control device 26 is operated to supply a pilot pressure to the pilot line 26*a* such that the arm-related, directional control valve 24 is changed over into the left position, pressure oil delivered from the main hydraulic pump 21 is supplied to the rod chamber 6*b* of the boom cylinder 6 via the line 28, the boom-related, directional control valve 23 and the main line 29*b*, and as mentioned above, the pressure oil delivered from the main hydraulic pump 21 is also supplied to the bottom chamber 7*a* of the arm cylinder 7 via the line 27, the arm-related, directional control valve 24 and the main line 30*a*. As a result, the boom cylinder 6 is operated in a retracting direction and the arm cylinder 7 is operated in the extending direction, so that the boom 3 is caused to swing in a lowering direction opposite to arrow 12 in FIG. 12 and the arm 4 is caused to swing in the direction of arrow 11. A combined operation of boom lowering and arm crowding is performed, accordingly.

As the pilot pressure is being supplied to the pilot line 25*b* in the boom operating system during such a combined operation, a control pressure is guided into the control line 48 so that the pilot-controlled check valve 47 is brought into an open position to bring the line 46 and the reservoir line 42 into a communicated state.

Even when the bottom pressure of the arm cylinder 7 rises to a high pressure equal to or higher than the predetermined pressure and the switching valve 44 is changed over into the left position in FIG. 1 to bring the bottom chamber 6*a* of the boom cylinder 6 and the communication line 40 into a communicated state via the boom-related, directional control valve 23, the bottom chamber 6*a* of the boom cylinder 6 is brought into a state communicated with the reservoir 43 because the reservoir line 42 and the line 46 are in the communicated state as mentioned above.

In this state, the pressure oil in the bottom chamber 6*a* of the boom cylinder 6 is returned to the reservoir 43 via the main line 29*a* and the boom-related, directional control valve 23. The pressure oil in the bottom chamber 6*a* of the boom cylinder 6 is, therefore, not supplied to the bottom chamber 7*a* of the arm cylinder 7 via the communication line 40 so that no acceleration is performed in arm crowding.

Upon performing a combined operation including arm dumping in which pressure oil is supplied to the rod chamber 7*b* of the arm cylinder 7, the bottom chamber 7*a* of the arm cylinder 7 is brought into communication with the reservoir 43. No pressure is, therefore, developed in the communication line 40 so that no acceleration of the arm cylinder 7 is performed.

In the first embodiment constructed as described above, the pressure oil in the rod chamber 6*b* of the boom cylinder 6 can be combined to that in the bottom chamber 7*a* of the arm cylinder 7 during a combined operation of boom raising and arm crowding, said combined operation being frequently performed during digging work or the like of earth. This makes it possible to effectively use the pressure oil in the rod chamber 6*b* of the boom cylinder 6, said pressure oil having heretofore been simply drained into the reservoir 43, for the acceleration of the arm cylinder 7 and hence, to achieve an improvement in the efficiency of the work.

Even when the bottom pressure of the arm cylinder 7 is a high pressure equal to or higher than the predetermined pressure, an acceleration of the arm cylinder 7, in other words, an acceleration of the operating speed of arm crowding can be reduced by opening the pilot-controlled check valve 47 when boom lowering which requires retraction of the boom cylinder 6 is performed. It is, therefore, possible to continue the desired working performance by the combined operation of boom lowering and arm crowding.

Figure 3:
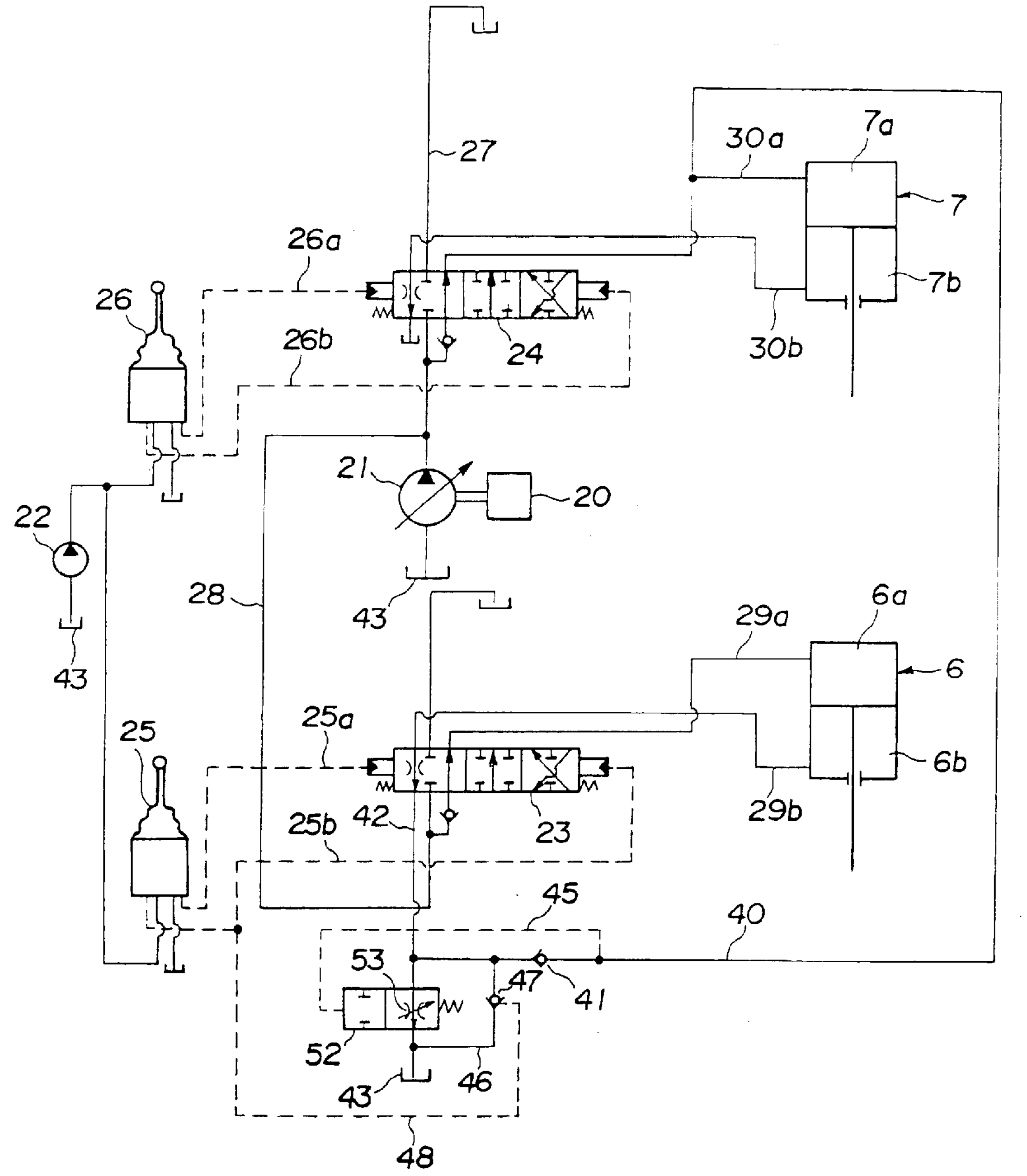
FIG. 3 is a hydraulic circuit diagram showing a second embodiment of the present invention.

FIG. 3 is a hydraulic circuit diagram showing the second embodiment of the present invention.

The second embodiment is constituted especially such that a switching valve 52, which maintains the communication line 40 in a communicating state when the bottom pressure of the arm cylinder 7 as the second hydraulic cylinder has increased to a high pressure equal to or higher than the predetermined pressure, includes a variable restrictor 53. The remaining constitution is similar to the corresponding constitution in the above-described first embodiment shown in FIG. 1.

According to the second embodiment constituted as described above, similar advantageous effects are obtained as in the above-described first embodiment, and in addition, the opening of the variable restrictor 53 incorporated in the switching valve 52 varies in accordance with the level of the bottom pressure of the arm cylinder 7. Described specifically, when the bottom pressure of the arm cylinder 7 is relatively low although it is equal to or higher than the predetermined pressure, the opening of the variable restrictor 53 in the switching valve 52 becomes greater so that a major portion of the pressure oil from the rod chamber 6*b* of the boom cylinder 6 is returned to the reservoir 43 through the variable restrictor 53. In other words, the flow rate of the pressure oil from the rod chamber 6*b* of the boom cylinder 6, said pressure oil being to be supplied to the communication line 40, is low so that the speed of the arm cylinder 7 is limited only to a slight increase. When the bottom pressure of the arm cylinder 7 is a high pressure equal to or higher than the predetermined pressure and is relatively high, on the other hand, the opening of the variable restrictor 53 in the switching valve 52 becomes smaller so that the flow rate of the pressure oil to be supplied from the rod chamber 6*b* of the boom cylinder 6 to the communication line 40 becomes higher to make the speed of the arm cylinder 7 still higher.

It is, therefore, possible to supply a flow rate, which depends upon the level of the bottom pressure of the arm cylinder 7, for the acceleration of the arm cylinder 7 via the communication line 40 and also to prevent development of a shock which would otherwise take place as a result of a sudden change in the speed of the arm cylinder 6 during acceleration.

Figure 4:
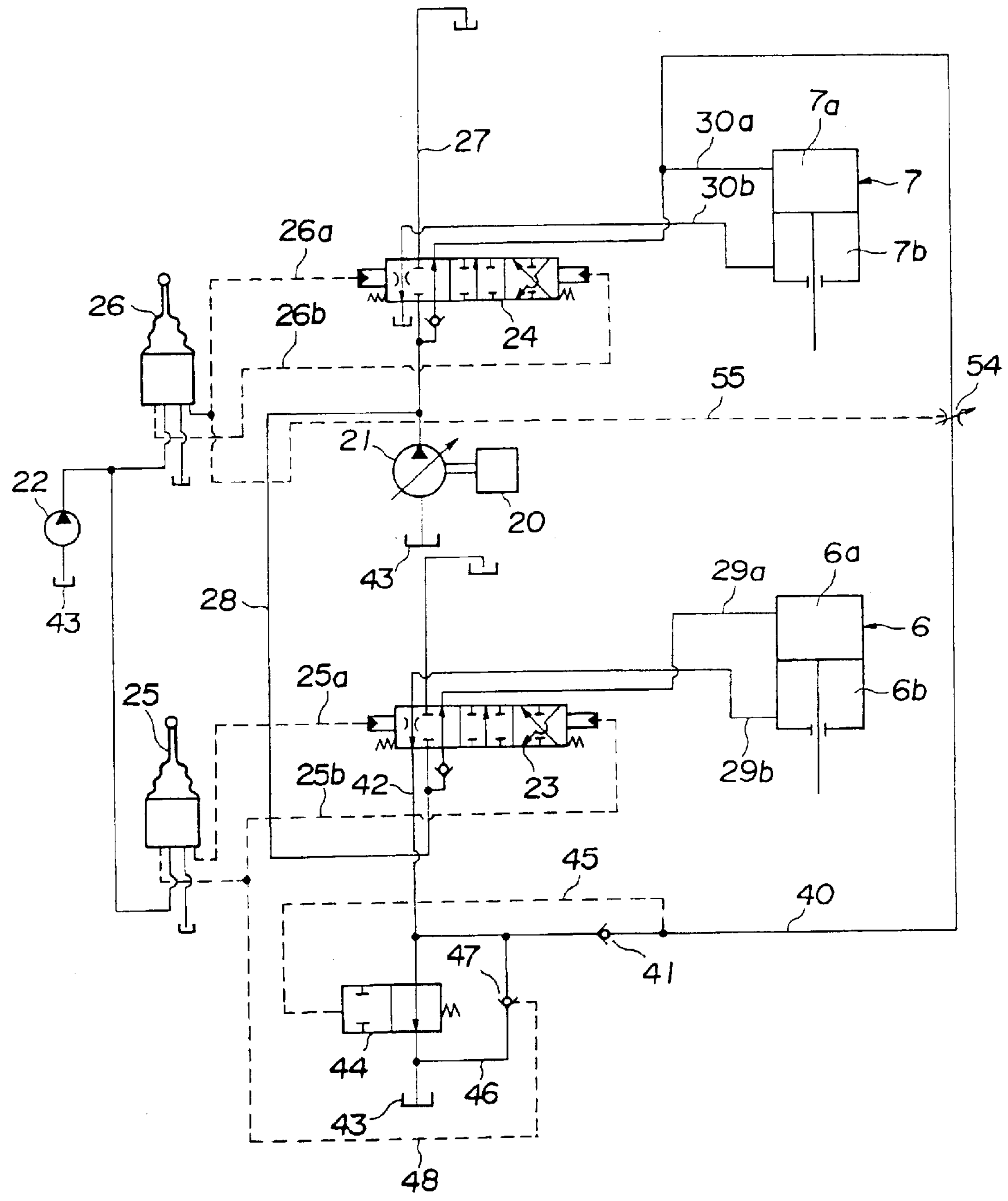
FIG. 4 is a hydraulic circuit diagram showing a third embodiment of the present invention.

FIG. 4 is a hydraulic circuit diagram showing the third embodiment of the present invention.

This third embodiment is provided especially with a first flow-rate controlling means for controlling a flow rate through the communication line 40 in accordance with the quantity of an operation of the arm control device as the second control device. This first flow-rate controlling means is constituted including a variable restrictor 54 and a control line 55. The variable restrictor is interposed, for example, at an intermediate point of the communication line 40 through which the check valve 41 and the bottom chamber 7*a* of the arm cylinder 7 are communicated with each other, and a control line communicates the variable restrictor 54 and the pilot line 26*a* in the arm operating system with each other. The remaining constitution is similar to the corresponding constitution in the above-described first embodiment depicted in FIG. 1.

According to the third embodiment constituted as described above, advantageous effects equivalent to those of the above-described first embodiment can be obtained. In addition and in particular, the flow rate through the communication line 40 can be controlled in accordance with the quantity of an operation of the arm control device 26, which operates the arm cylinder 6, via the variable restrictor 54 without relying solely upon the quantity of a change-over of the switching valve 44. When the quantity of an operation of the arm control device 26 is relatively small upon performing arm crowding, for example, the control pressure applied to the variable restrictor 54 via the pilot line 26*a* and the control line 55 is small, and accordingly, the opening of the variable restrictor 54 becomes relatively small. Through this small opening, the pressure oil is supplied at a relatively small flow rate from the communication line 40 to the bottom chamber 6*a* of the arm cylinder 6. As a result, the speed of the arm cylinder 6, which is in an accelerated state, can be made relatively low. When the quantity of an operation of the arm control device 26 becomes relatively large during an arm crowding operation, the control pressure applied to the variable restrictor 54 becomes higher, and the opening of the variable restrictor 54 becomes greater correspondingly. Through this large opening, the pressure oil is supplied at a high flow rate from the communication line 40 to the bottom chamber 6*a* of the arm cylinder 6. As a result, the speed of the arm cylinder 6, which is in an accelerated state, can be made faster.

Namely, an acceleration of the arm cylinder 7 can be achieved in accordance with the quantity of an operation of the arm control device 26. An arm crowding operation can be performed by smoothly accelerating the arm cylinder 7 such that the arm crowding operation becomes consistent with the operator's feeling of operation.

Figure 5:
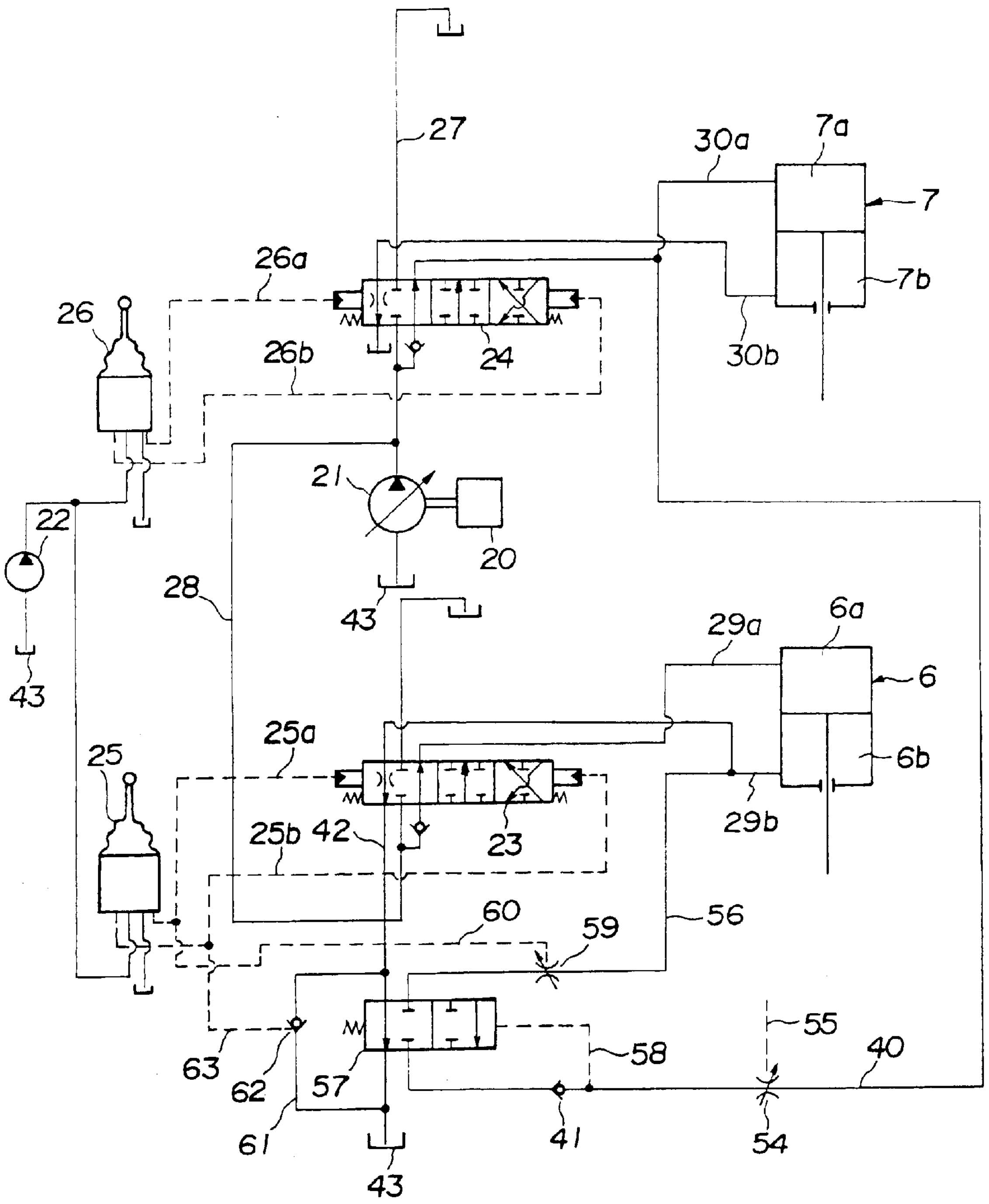
FIG. 5 is a hydraulic circuit diagram showing a fourth embodiment of the present invention.

FIG. 5 is a circuit diagram showing the fourth embodiment of the present invention.

This fourth embodiment is constituted especially such that the hydraulic driving unit is provided with a second flow-rate controlling means to control a flow rate through the communication line 40 in accordance with the quantity of an operation of the boom control device 25 as the first control device. This second flow-rate controlling means is constituted including, for example, a branch line 57, a variable restrictor 59 and a control line 60. The branch line is connected at an end thereof to the main line 29*b*, which communicates the boom-related, directional control valve 23 and the rod chamber 6*b* of the boom cylinder 6 with each other, and at an opposite end thereof to a switching valve 57, the variable restrictor is arranged on the branch line 56, and the control line is connected at an end thereof to the pilot line 25*a* in the boom operation system and at an opposite end thereof to the variable restrictor 59.

Further, the switching valve 57 is interposed in the reservoir line 42, and is also interposed at a point of connection between the branch line 56 and the communication line 40.

The fourth embodiment is also provided with a bypass line 61, an on/off valve, for example, a pilot-controlled check valve 62 arranged on the bypass line 61, and a control line 63 connected at an end thereof to the pilot line 25*b* in the boom operating system and at an opposite end thereof to the pilot-controlled check valve 62. The bypass line communicates a reservoir line 42, said drain-line being located on an upstream side of the switching valve 57, and the reservoir line 42, said drain-line being located on a downstream side of the switching valve 57, with each other. In FIG. 5, numeral 58 indicates a control line which constitutes a detection means for detecting the bottom pressure of the arm cylinder 7.

The remaining constitution is similar to the corresponding constitution in the above-described third embodiment depicted in FIG. 4.

In the fourth embodiment constituted as described above, similar advantageous effects are obtained as in the above-described third embodiment shown in FIG. 4. In addition and in particular, the flow rate through the communication line 40 can also be controlled in accordance with the quantity of an operation of the boom control device 25 which controls the boom cylinder 6. When during a combined operation of boom raising and arm crowding, for example, the bottom pressure of the arm cylinder 7 rises to a high pressure equal to or higher than the predetermined pressure, the switching valve 57 is in a state changed over in the right position of FIG. 5 and communicating the branch line 56 and the communication line 40 via the switching valve 57, and the quantity of an operation of the boom control device 25 is relatively small, a control pressure to be applied to the variable restrictor 59 via the pilot line 25*a* and the control line 60 as a result of the operation of the boom control device 25 is relatively low. As a consequence, the opening of the variable restrictor 59 becomes relatively small so that through this small opening, the pressure oil in the rod chamber 6*b* of the boom cylinder 6 can be supplied at a relatively low flow rate to the bottom chamber 7*a* of the arm cylinder 7 via the branch line 56, the variable restrictor 59, the switching valve 57, the check valve 41 and the communication line 40. As a result, the speed of the arm cylinder 7, which is in an accelerated state, can be made relatively low.

When during the above-mentioned combined operation of boom raising and arm crowding, the bottom pressure of the arm cylinder 7 rises to a high pressure equal to or higher than the predetermined pressure, the switching valve 57 is in a state changed over in the right position of FIG. 5, and the quantity of an operation of the boom control device 25 is relatively large, a control pressure to be applied to the variable restrictor 59 as a result of the operation of the boom control device 25 becomes high. As a consequence, the opening of the variable restrictor 59 becomes large so that through this large opening, the pressure oil in the rod chamber 6*b* of the boom cylinder 6 can be supplied at a high flow rate to the bottom chamber 7*a* of the arm cylinder 7 via the branch line 56, the variable restrictor 59, the switching valve 57, the check valve 41 and the communication line 40. As a result, the speed of the arm cylinder 7, which is in an accelerated state, can be made faster.

Namely, in this fourth embodiment, an acceleration of the arm cylinder 7 can also be achieved not only in accordance with the quantity of an operation of the arm control device 26 but also in accordance with the quantity of an operation of the boom control device 25. A combined operation of arm raising and arm crowding can be performed by smoothly accelerating the arm cylinder 7 such that the combined operation of arm raising and arm crowding becomes more consistent with the operator's feeling of operation.

When during a combined operation of boom lowering and arm crowding, the bottom pressure of the arm cylinder 7 rises to a high pressure equal to or higher than the predetermined pressure, the switching valve 57 is in a state ready for being changed over into the right position in FIG. 5, and the boom control device 25 is operated to apply a control pressure to the pilot-controlled variable restrictor 62 via the pilot line 25*b* and the control line 63, the pilot-controlled variable restrictor 62 is opened such that the pressure oil in the bottom chamber 6*a* of the boom cylinder 6 is returned to the reservoir 43 via the main line 29*a*, the boom-related, directional control valve 23, the reservoir line 42, the line 61 and the pilot-controlled check valve 62. It is, therefore, possible to perform a retracting operation of the boom cylinder 6, that is, a boom lowering operation as desired.

As the pilot line 25*a* in the boom operating system is brought into the same pressure as the reservoir pressure in this case, the control line 60 is also brought to the reservoir pressure and hence, the variable restrictor 59 is closed. Therefore, the pressure oil in the rod chamber 6*b* of the boom cylinder 6 is not combined to the pressure oil in the bottom chamber 7*a* of the arm cylinder 7.

Figure 6:
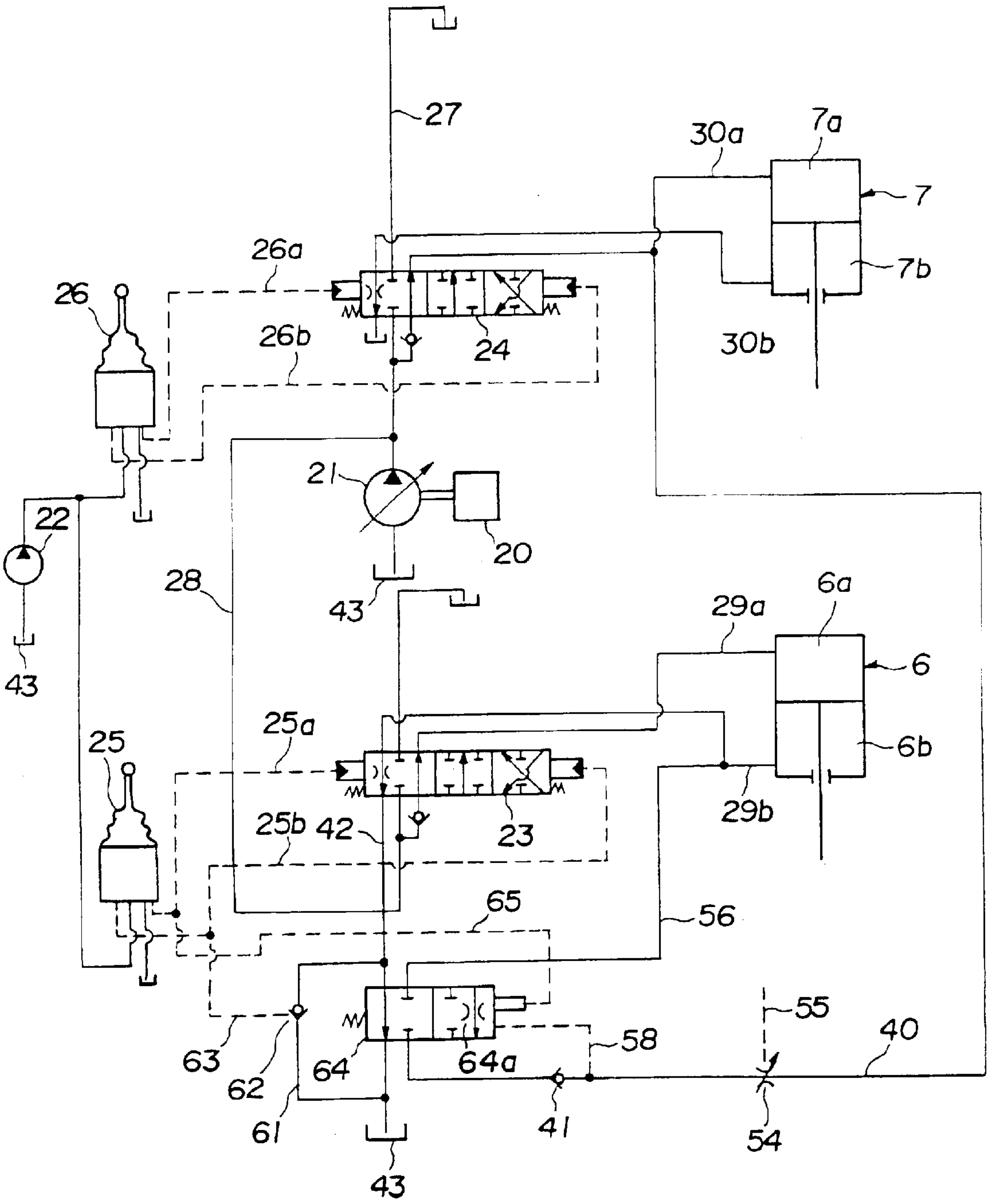
FIG. 6 is a hydraulic circuit diagram showing a fifth embodiment of the present invention.

FIG. 6 is a hydraulic circuit diagram showing the fifth embodiment of the subject invention.

This fifth embodiment is constituted especially such that the second flow-rate controlling means, which controls the flow rate through the communication line 40 in accordance with the quantity of an operation of the boom control device 25 as the first control device, includes, for example, a variable restrictor 64*a* arranged in a switching valve 64 and also a control line 65 through which the pilot line 25*a* in the boom operating system and the control compartment of the switching valve 64 are communicated with each other. The remaining constitution is equivalent to the corresponding constitution in the above-described fourth embodiment depicted in FIG. 5.

Similarly to the fourth embodiment illustrated in FIG. 5, the fifth embodiment constituted as described above can also control the flow rate through the communication line 40 in accordance with the quantity of an operation of the boom control device 25 which operates the boom cylinder 6.

When during a combined operation of boom raising and arm crowding, in particular, the bottom pressure of the arm cylinder 7 rises to a high pressure equal to or higher than the predetermined pressure, the switching valve 64 is in a state immediately before its being changed over into the right position in FIG. 6, and the quantity of an operation of the boom control device 25 is relatively small, a control pressure to be applied to the corresponding control compartment of the switching valve 64 via the pilot line 25*a* and the control line 65 as a result of the operation of the boom control device 25 is relatively low. As a consequence, the quantity of a change-over of the switching valve 64 is small, and the opening of the variable restrictor 64*a* included in the switching valve 64 becomes relatively small. Through this small opening, the pressure oil in the rod chamber 6*b* of the boom cylinder 6 can be supplied at a relatively low flow rate to the bottom chamber 7*a* of the arm cylinder 7 via the branch line 56, the variable restrictor 64*a* in the switching valve 64, the check valve 41 and the communication line 40. As a result, the speed of the arm cylinder 7, which is in an accelerated state, can be made relatively low.

When the quantity of an operation of the boom control device 25 is relatively large, a control pressure to be applied to the control compartment of the switching valve 64 as a result of the operation of the boom control device 25 becomes high. As a consequence, the opening of the variable restrictor 64*a* in the switching valve 64 becomes large. Through this large opening, a majority of the pressure oil in the rod chamber 6*b* of the boom cylinder 6 can be supplied to the bottom chamber 7*a* of the arm cylinder 7. As a result, the speed of the arm cylinder 7, which is in an accelerated state, can be made faster.

In the fifth embodiment constituted as described above, similar advantageous effects are also obtained as in the above-described fourth embodiment.

In this fifth embodiment, even when during a combined operation of boom lowering and arm crowding, the bottom pressure of the arm cylinder 7 rises to a high pressure equal to or higher than the predetermined pressure, the switching valve 64 is in a state immediately before its being changed over into the right position in FIG. 6, the pilot line 25*a* in the boom operating system is brought into the same pressure as the reservoir pressure and the variable restrictor 64*a* in the switching valve 64 is closed. Therefore, the pressure oil in the rod chamber 6*b* of the boom cylinder 6 is not combined to the pressure oil in the bottom chamber 7*a* of the arm cylinder 7.

Figure 7:
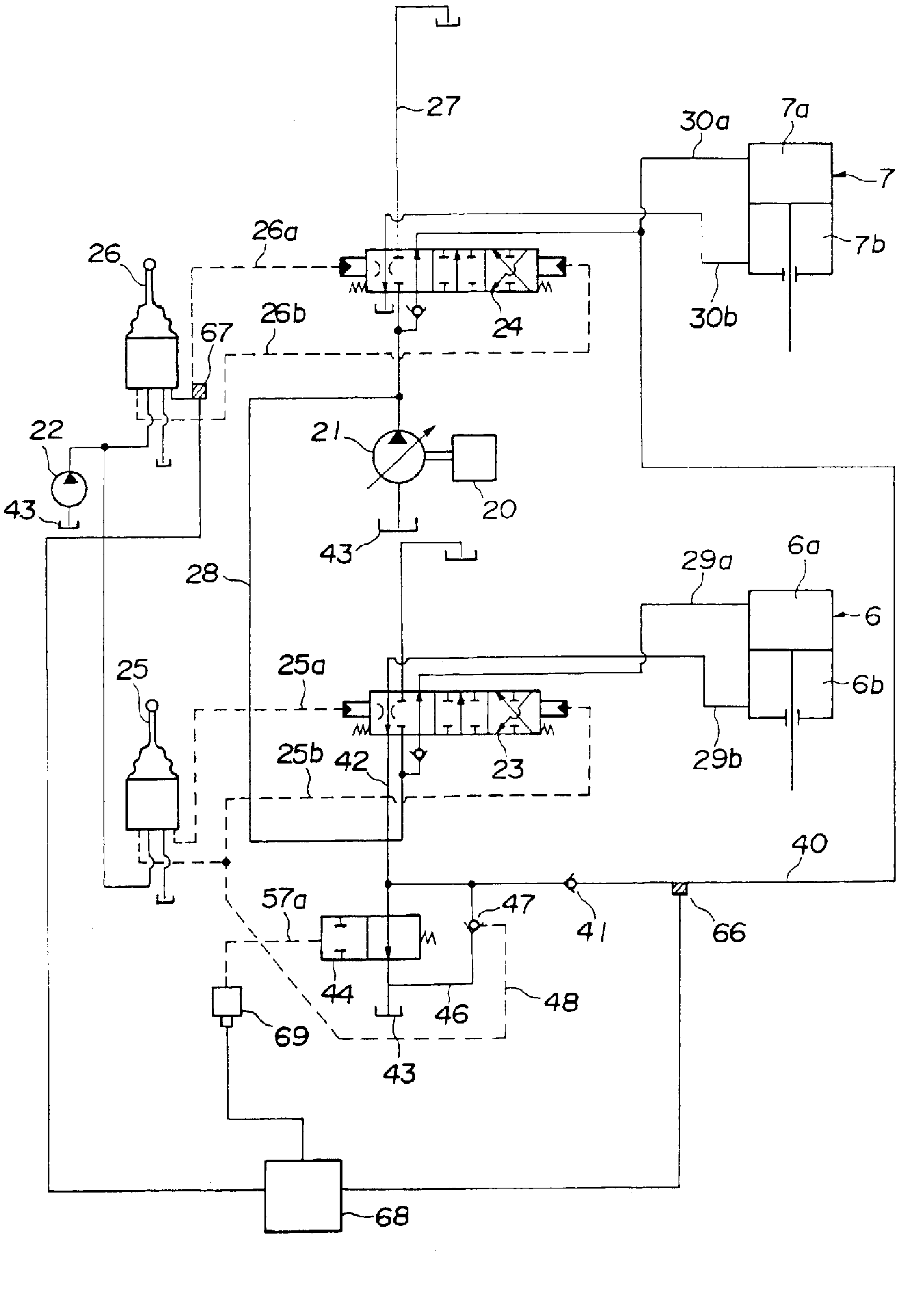
FIG. 7 is a hydraulic circuit diagram showing a sixth embodiment of the present invention.
Figure 8:
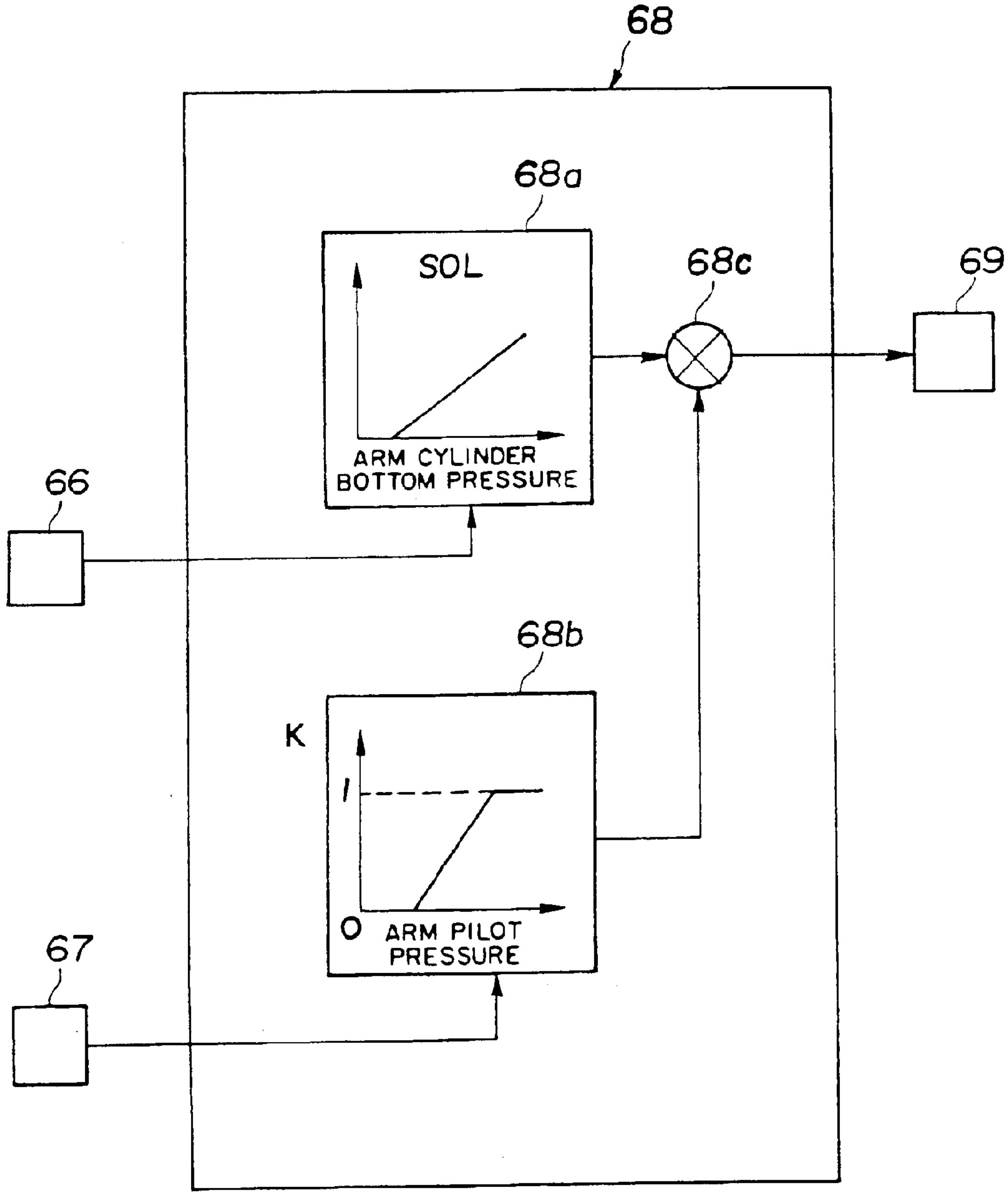
FIG. 8 is a block diagram illustrating the constitution of an essential part of a controller arranged in the sixth embodiment shown in FIG. 7.

FIG. 7 is a hydraulic circuit diagram showing the sixth embodiment of the subject invention, and FIG. 8 is a block diagram illustrating the constitution of an essential part of a controller arranged in the sixth embodiment shown in FIG. 7.

The sixth embodiment shown in these FIGS. 7 and 8 is provided with a communication controlling means for communicating the rod chamber 6*b* of the boom cylinder 6 as the first hydraulic cylinder with the bottom chamber 7*a* of the arm cylinder 7 as the second hydraulic cylinder when the bottom pressure of the arm cylinder 7 has risen to a high pressure equal to or higher than the predetermined pressure. The communication controlling means is constituted with a bottom pressure detector 66 arranged on the communication line 40 to detect a bottom pressure of the arm cylinder 7 and to output an electrical signal, a controller 68 for outputting a control signal to selectively control the switching valve 44 in response to the signal outputted from the bottom pressure detector 66, an electrohydraulic converter 69 for outputting a control pressure corresponding to the value of the control signal outputted from the controller 68, and a control line 57*a* communicating the electrohydraulic converter 69 and the control compartment of the switching valve 44 with each other.

On the pilot line 26*a* in the arm control system, a first operation-quantity detector for detecting the quantity of an operation of the arm control device 26 as the second control device and outputting an electrical signal, that is, an arm pilot pressure detector 67 is also arranged.

As illustrated in FIG. 8, the controller 68 includes a first function generator 68*a*, a second function generator 68*b* and a first multiplier 8*c*. The first function generator outputs a value, which becomes gradually greater as the bottom pressure of the arm cylinder 7 rises. The second function generator outputs a value, which becomes gradually greater but not beyond 1 as an upper limit as the quantity of an operation of the arm control device 26 increases. The first multiplier multiplies a signal, which is outputted from the first function generator 68*a*, with a signal outputted from the second function generator 68*b*.

The remaining constitution is equivalent to the corresponding constitution in the above-described first embodiment depicted in FIG. 1.

In the sixth embodiment constituted as described above, when upon performing a combined operation of boom raising and arm crowding in particular, the boom control device 25 is operated to supply a pilot pressure to the pilot line 25*a* such that the boom-related, directional control valve 23 is changed over into the left position as shown in FIG. 7 and the arm control device 26 is operated to supply a pilot pressure to the pilot line 26*a* such that the arm-related, directional control valve 24 is changed over into the left position, pressure oil delivered from the main hydraulic pump 21 is supplied to the bottom chamber 6*a* of the boom cylinder 6 and also to the bottom chamber 7*a* of the arm cylinder 7. As a result, the boom cylinder 6 and arm cylinder 7 are both operated in the extending directions so that the combined operation of boom raising and arm crowding is performed.

During this combined operation, the pilot line 25*b* of the boom operating system is not supplied with the pilot pressure, and remains under the same pressure as the reservoir pressure. Therefore, the control line 48 takes the reservoir pressure so that the pilot-controlled check valve 47 remains in a closed position to prevent communication between the communication line 40 and the reservoir 43 via the line 46.

When the bottom pressure of the arm cylinder 7 is of a level lower than the predetermined pressure, a signal value detected at the arm bottom pressure detector 66 is small so that a signal value outputted from the first function generator 68*a* to the first multiplier 68*c* in the controller 68 shown in FIG. 8 is small. If the quantity of the operation of the arm control device 26 is small at this time, the signal value detected at the arm pilot pressure detector 67 is small. At the first multiplier 68*c*, the relatively small signal values are multiplied with each other, and a control signal of the small value is outputted from the controller 68 to the electrohydraulic converter 69. The electrohydraulic converter 69 outputs a relatively low control pressure to the control line 57*a*. In this state, the force applied by the control pressure to the control compartment of the switching valve 44 is smaller than the spring force so that the switching valve 44 is held in the right position shown in FIG. 7. The pressure oil in the rod chamber 6*b* of the boom cylinder 6 is, therefore, not supplied to the communication line 40 during the extending operation of the boom cylinder 6.

When the bottom pressure of the arm cylinder 7 rises to a high pressure equal to or higher than the predetermined pressure from such a state as described above, the signal value detected at the arm bottom pressure detector 66 becomes greater so that the signal value outputted from the first function generator 68*a* to the first multiplier 68*c* in the controller 68 shown in FIG. 8 becomes greater. If the quantity of the operation of the arm control device 26 becomes greater at this time, the signal value detected at the arm pilot pressure detector 67 becomes greater, and the signal value outputted from the second function generator 68*b* to the first multiplier 68*c* becomes greater. At the first multiplier 68*c*, the large signal values are, therefore, multiplied with each other, and a control signal of a large value is outputted from the controller 68 to the electrohydraulic converter 69. Responsive to this, the electrohydraulic converter 69 outputs a high control pressure to the control line 57*a*. As a result, the force which is applied by the control pressure to the control compartment of the switching valve 44 becomes greater than the spring force so that the switching valve 44 is changed over into the left position shown in FIG. 7. When this state is reached, the reservoir line 42 is cut off by the switching valve 44, and the pressure oil which has been guided to the main line 29*a*, the boom-related, directional control valve 23 and the reservoir line 42 from the rod chamber 6*b* of the boom cylinder 6 is supplied to the communication line 40 via through the check valve 41. This pressure oil supplied from the communication line 40 is supplied to the bottom chamber 7*a* of the arm cylinder 7 via the main line 30*a*. Namely, the pressure oil supplied via the arm-related, directional control valve 24 and the pressure oil supplied from the rod chamber 6*b* of the boom cylinder 6 are combined and supplied to the bottom chamber 7*a* of the arm cylinder 7. As a result, an acceleration of the arm cylinder 6 in its extending direction can be performed, and the operating speed of arm crowding can be made faster.

In the sixth embodiment constituted as described above, the pressure oil in the rod chamber 6*b* of the boom cylinder 6 can also be effectively used for the acceleration of the arm cylinder 7 as in the above-described first embodiment shown in FIG. 1 although the pressure oil has heretofore been returned to the reservoir 43. It is, therefore, possible to achieve an improvement in the efficiency of work.

In this sixth embodiment, the acceleration of the arm cylinder 7 can be achieved corresponding to the quantity of an operation of the arm control device 26 on the basis of the functional relation of the second function generator 68*b* in the controller 68. An arm crowding operation can, therefore, be performed by smoothly accelerating the arm cylinder 7 such that the arm crowding operation becomes consistent with the operator's feeling of operation.

Figure 9:
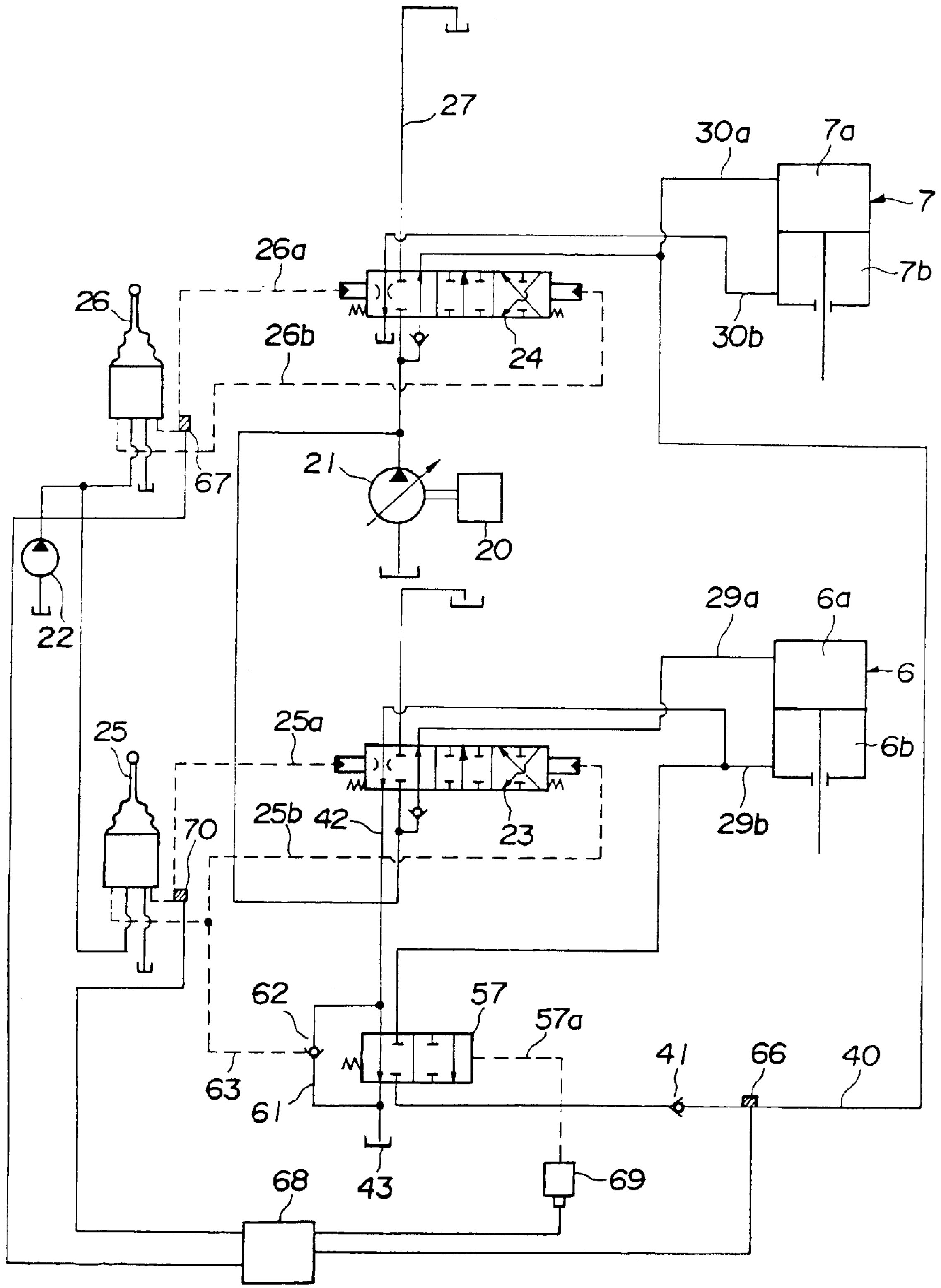
FIG. 9 is a hydraulic circuit diagram showing a seventh embodiment of the present invention.
Figure 10:
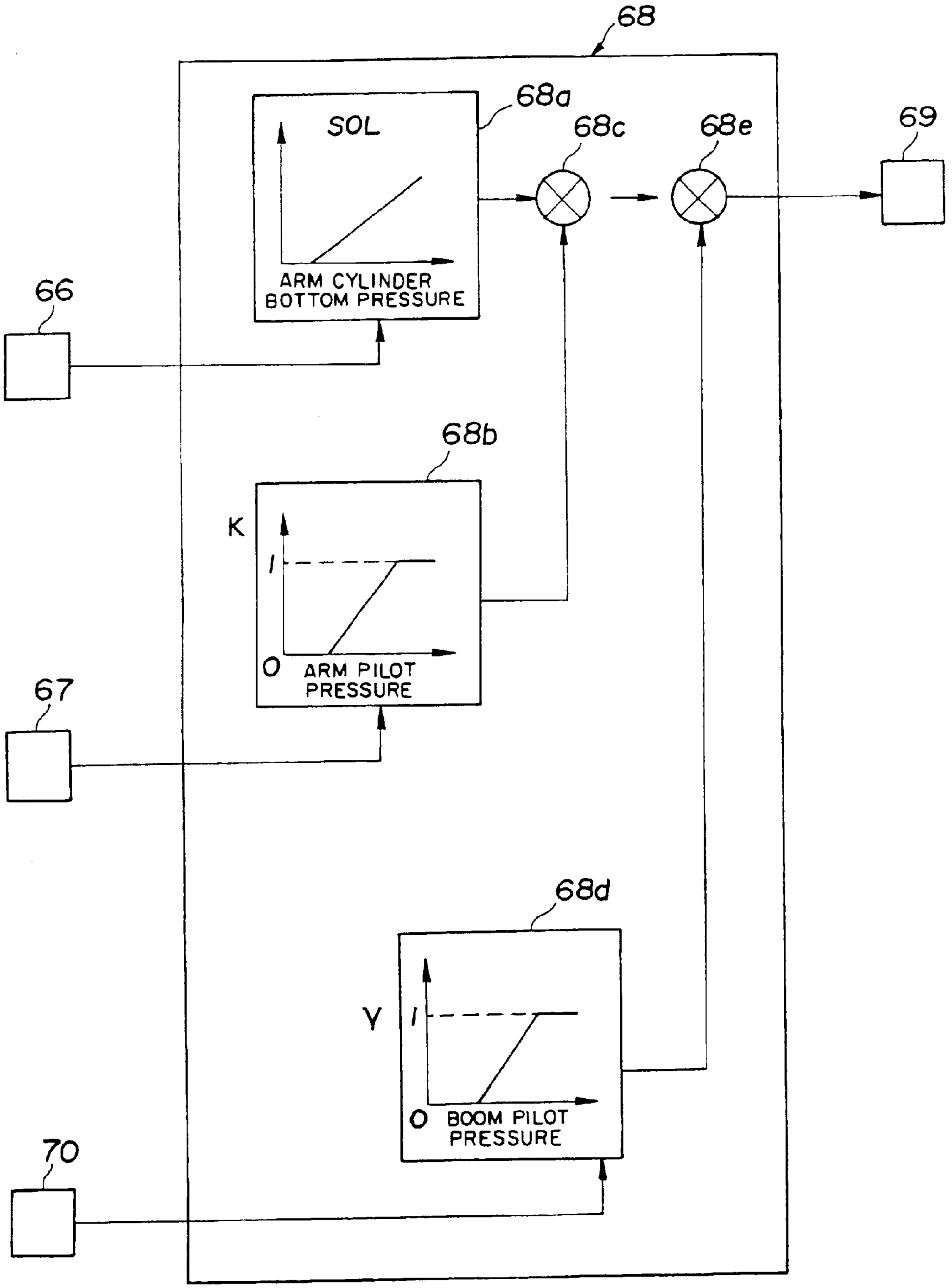
FIG. 10 is a block diagram illustrating the constitution of an essential part of a controller arranged in the seventh embodiment shown in FIG. 9.

FIG. 9 is a hydraulic circuit diagram showing the seventh embodiment of the subject invention, and FIG. 10 is a block diagram illustrating the constitution of an essential part of a controller arranged in the seventh embodiment.

The seventh embodiment shown in these FIGS. 9 and 10 is provided with a bottom pressure detector 66, an electrohydraulic converter 69 and an arm pilot pressure detector 67 making up the first operated-quantity detector, all of which are similar to the corresponding elements described above in connection with the sixth embodiment. In addition, the pilot line 25*a* in the boom operating system is provided with a second operated-quantity detector for detecting the quantity of an operation of the boom control device 25 as the first control device and outputting an electrical signal, that is, a boom pilot pressure detector 70.

The controller 68, on the other hand, includes not only the first function generator 68*a*, the second function generator 68*b* and the first multiplier 68*c* as in the above-described sixth embodiment but also a third function generator 68*d* and a second multiplier 68*e*. This third function generator outputs a value, which increases gradually but not beyond 1 as an upper limit as the quantity of an operation of the boom control device 25 as the first control device becomes greater. The second multiplier multiplies a signal, which is outputted from the first multiplier 68*c*, with a signal outputted form the third function generator 68*d*.

The remaining constitution is similar to the corresponding constitution in the above-described fourth embodiment depicted in FIG. 5.

The seventh embodiment constituted as described above can also bring about equivalent advantageous effects to the above-described fourth embodiment depicted in FIG. 5 or the above-described sixth embodiment illustrated in FIG. 7. In addition and in particular, an acceleration of the arm cylinder 7 can also be achieved corresponding to the quantity of an operation of the boom control device 25 on the basis of the functional relation of the third function generator 68*d* in the controller 68. A combined operation of arm raising and arm crowding can, therefore, be performed by smoothly accelerating the arm cylinder 7 such that the combined operation becomes more consistent with the operator's feeling of operation.

In each of the above-described embodiments, the first hydraulic cylinder comprises the boom cylinder 6 and the second hydraulic cylinder comprises the arm cylinder 7. The second hydraulic cylinder can, however, comprise the bucket cylinder 8 illustrated in FIG. 12. In this case, an acceleration of the bucket cylinder 8 can be achieved.

In the above description, the present invention was applied to the center-bypass hydraulic driving units. However, the present invention is not limited to such applications, and can be constituted such that it is applicable to hydraulic driving units equipped with closed-center directional control valves.

INDUSTRIAL APPLICABILITY

During a combined operation performed by supplying pressure oil to respective bottom chambers of a first hydraulic cylinder and second hydraulic cylinder, the pressure oil in the rod chamber of the first hydraulic cylinder has heretofore been returned to a reservoir when the bottom pressure of the second hydraulic cylinder becomes high. According to the invention as described in each claim of the subject application, the pressure oil in the rod chamber of the first hydraulic cylinder can be effectively used for the acceleration of the second hydraulic cylinder in its extending direction, and therefore, an improvement can be achieved in the efficiency of work performed by such a combined operation of these first hydraulic cylinder and second hydraulic cylinder.

According to the invention as described in claim 4 or 5, even when the bottom pressure of the second hydraulic cylinder is a high pressure equal to or higher than a predetermined pressure, the second hydraulic cylinder can be prevented from an acceleration in the case of an operation to cause retraction of the first hydraulic cylinder. A desired work performance, which does not require an acceleration of the second hydraulic cylinder, can thus be continued.

According to the invention as described in claim 6, pressure oil can be supplied at a flow rate, which corresponds to the level of the bottom pressure of the second hydraulic cylinder, through a communication line for the acceleration of the second hydraulic cylinder. This makes it possible to prevent occurrence of a shock which would otherwise take place as a result of a sudden change in the speed of the second hydraulic cylinder during an acceleration.

According to the invention as described in claim 7 or 8, an acceleration of the second hydraulic cylinder can be achieved corresponding to the quantity of an operation of the second control device which operates the second hydraulic cylinder. This makes it possible to smoothly accelerate the second hydraulic pressure.

According to the invention as described in claim 9, 10 or 11, an acceleration of the second hydraulic cylinder can also be achieved corresponding to the quantity of an operation of the first control device which operates the first hydraulic cylinder. This also makes it possible to smoothly accelerate the second hydraulic pressure.

According to the invention as described in claim 12, an acceleration of the second hydraulic cylinder under electrical control can be achieved.

According to the invention as described in claim 13, an acceleration of the second hydraulic cylinder can be achieved corresponding to the quantity of an operation of the second control device in the electrically-controlled, hydraulic driving unit. This also makes it possible to smoothly accelerate the second hydraulic pressure.

According to the invention as described in claim 14, an acceleration of the second hydraulic cylinder can also be achieved corresponding to the quantity of an operation of the first control device in the electrically-controlled, hydraulic driving unit. This also makes it possible to smoothly accelerate the second hydraulic pressure.

During a combined operation of boom raising and arm crowding performed by supplying pressure oil to respective bottom chambers of a boom cylinder and arm cylinder, the pressure oil in the rod chamber of the boom cylinder has heretofore been drained to a reservoir when the bottom pressure of the arm cylinder becomes high. According to the invention as described in claim 16, the pressure oil in the rod chamber of the boom cylinder can be effectively used for the acceleration of the arm cylinder in its extending direction, in other words, for the acceleration of arm crowding, and therefore, digging or like work of earth by this combined operation of boom raising and arm crowding can be performed with good efficiency.

What is claimed is:

1. A hydraulic driving unit mounted on a construction machine and provided with a main hydraulic pump, a first hydraulic cylinder and second hydraulic cylinder driven by pressure oil delivered from said main hydraulic pump, a first directional control valve for controlling a flow of pressure oil to be supplied from said main hydraulic pump to said first hydraulic cylinder, a second directional control valve for controlling a flow of pressure oil to be supplied from said main hydraulic pump to said second hydraulic pump, a first control device for selectively controlling said first directional control valve, and a second control device for selectively controlling said second directional control valve, wherein:

said hydraulic driving unit is provided with a communication controller to bring a rod chamber of said first hydraulic cylinder and a bottom chamber of said second hydraulic cylinder into communication with each other when a bottom pressure of said second hydraulic cylinder has increased to a high pressure equal to or higher than a predetermined pressure.

2. A hydraulic driving unit according to claim 1, wherein said communication controller comprises:

a communication line capable of bringing said rod chamber of said first hydraulic cylinder and said bottom chamber of said second hydraulic cylinder into communication with each other, a check valve arranged on said communication line to prevent a flow of pressure oil from said bottom chamber of said second hydraulic cylinder toward said rod chamber of said first hydraulic cylinder, and a switching valve for communicating said communication line to a reservoir when said bottom pressure of said second hydraulic cylinder is lower than said predetermined pressure and for maintaining said communication line in a communicating state when said bottom pressure of said second hydraulic pressure has become equal to or higher than said predetermined pressure.

3. A hydraulic driving unit according to claim 2, wherein said hydraulic driving unit is provided with a detector to detect said bottom pressure of said second hydraulic cylinder, and said switching valve is operated in accordance with said bottom pressure of said second hydraulic cylinder as detected by said detector.

4. A hydraulic driving unit according to claim 2, wherein said hydraulic driving unit is provided with:

a line connected at an end thereof to an upstream side of said switching valve and communicated at an opposite end thereof to said reservoir, and an on/off valve arranged on said line to open said line responsive to a predetermined operation of said first control device.

5. A hydraulic driving unit according to claim 4, wherein said first control device is a pilot control device for generating a pilot pressure, and said on/off valve is a pilot-controlled check valve.

6. A hydraulic driving unit according to claim 2, wherein said switching valve comprises a variable restrictor.

7. A hydraulic driving unit according to claim 2, wherein said hydraulic driving unit is provided with a first flow rate control to control a flow rate through said communication line in accordance with a quantity of an operation of said second control device.

8. A hydraulic driving unit according to claim 7, wherein said first flow rate control comprises a variable restrictor.

9. A hydraulic driving unit according to claim 7, wherein said hydraulic driving unit is provided with a second flow rate control to control a flow rate through said communication line in accordance with a quantity of an operation of said first control device.

10. A hydraulic driving unit according to claim 9, wherein said second flow rate control comprises a variable restrictor.

11. A hydraulic driving unit according to claim 9, wherein said first control device is a pilot control device for generating a pilot pressure, said switching valve is a pilot-controlled switching valve with a variable restrictor incorporated therein, and said second flow rate control comprises a control line for bringing said first control device and a control compartment of said pilot-controlled switching valve into communication with each other.

12. A hydraulic driving unit according to claim 2, wherein said communication control comprises:

a bottom pressure detector for detecting said bottom pressure of said second hydraulic cylinder and outputting an electrical signal, and a controller for outputting a control signal to selectively control said switching valve in accordance with said signal outputted from said bottom pressure detector.

13. A hydraulic driving unit according to claim 12, wherein said hydraulic driving unit is provided with a first operated-quantity detector for detecting a quantity of an operation of said second control device and outputting an electrical signal, and said controller comprises:

a first function generator for outputting a value such that said value gradually becomes greater as said bottom pressure of said second hydraulic cylinder becomes higher, a second function generator for outputting a value such that said value gradually becomes greater but not beyond 1 as an upper limit as said quantity of said operation of said second control device becomes greater, and a first multiplier for performing multiplication to output said control signal in accordance with a signal outputted from said first function generator and a signal outputted from said second function generator.

14. A hydraulic driving unit according to claim 13, wherein said hydraulic driving unit is provided with a second operated-quantity detector for detecting a quantity of an operation of said first control device to output an electrical signal, and said controller comprises:

a third function generator for outputting a value such that said value gradually becomes greater but not beyond 1 as an upper limit as said quantity of said operation of said first control device becomes greater, and a second multiplier for performing multiplication to output said control signal in accordance with a signal outputted from said first multiplier and a signal outputted from said third function generator.

15. A hydraulic driving unit according to claim 12, wherein said switching valve is a pilot-controlled switching valve, and said hydraulic driving unit is provided with:

an electrohydraulic converter for outputting a control pressure corresponding to a value of said control signal outputted from said controller, and a control line through which said electrohydraulic converter and a control compartment of said pilot-controlled switching valve are communicated with each other.

16. A hydraulic driving unit according to claim 1, wherein said first hydraulic cylinder and said second hydraulic cylinder comprise a boom cylinder and an arm cylinder, respectively, said first directional control valve and said second directional control valve comprise a center-bypass directional control valve for a boom and a center-bypass directional control valve for an arm, respectively, and said first control device and said second control device comprise a boom control device and an arm control device, respectively.

17. A hydraulic driving unit according to claim 1, wherein said construction machine is a hydraulic excavator.

* * * * *